(12) United States Patent
Gupta et al.

(10) Patent No.: US 11,693,984 B2
(45) Date of Patent: Jul. 4, 2023

(54) METHODS AND SYSTEMS FOR IMPLEMENTING PARENTAL CONTROLS

(71) Applicant: Rovi Guides, Inc., San Jose, CA (US)

(72) Inventors: Vikram Makam Gupta, Bangalore (IN); Vishwas Sharadanagar Panchaksharaiah, Tumkur District (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/180,271

(22) Filed: Feb. 19, 2021

(65) Prior Publication Data

US 2021/0173955 A1 Jun. 10, 2021

Related U.S. Application Data

(63) Continuation of application No. 17/089,225, filed on Nov. 4, 2020, which is a continuation of application No. 16/158,046, filed on Oct. 11, 2018, now Pat. No. 10,860,736, which is a continuation of application No. 14/858,255, filed on Sep. 18, 2015, now Pat. No. 10,127,398.

(51) Int. Cl.
| | | |
|---|---|---|
| *G06F 11/34* | (2006.01) | |
| *G06F 21/62* | (2013.01) | |
| *G06F 11/30* | (2006.01) | |

(52) U.S. Cl.
CPC ...... *G06F 21/6218* (2013.01); *G06F 11/3003* (2013.01); *G06F 11/3024* (2013.01); *G06F 11/3438* (2013.01); *G06F 11/3419* (2013.01); *G06F 2201/81* (2013.01); *G06F 2201/88* (2013.01); *G06F 2221/2135* (2013.01); *G06F 2221/2149* (2013.01)

(58) Field of Classification Search
None
See application file for complete search history.

(56) References Cited

U.S. PATENT DOCUMENTS

| | | |
|---|---|---|
| 5,914,797 A | 6/1999 | Yamamoto et al. |
| 6,112,186 A | 8/2000 | Bergh et al. |
| 6,239,794 B1 | 5/2001 | Yuen et al. |
| 6,388,714 B1 | 5/2002 | Schein et al. |
| 6,564,378 B1 | 5/2003 | Satterfield et al. |
| 6,671,323 B1 | 12/2003 | Tahara et al. |
| 6,756,997 B1 | 6/2004 | Ward, III et al. |
| 6,874,003 B2 | 3/2005 | Morohashi |
| 7,149,722 B1 | 12/2006 | Abburi |
| 7,165,098 B1 | 1/2007 | Boyer et al. |
| 7,761,892 B2 | 7/2010 | Ellis et al. |
| 8,046,801 B2 | 10/2011 | Ellis et al. |
| 8,359,389 B1 | 1/2013 | Cohen et al. |
| 8,880,648 B1 | 11/2014 | Arora et al. |
| 8,924,465 B1 | 12/2014 | Tunguz-Zawislak |
| 9,106,710 B1 | 8/2015 | Feimster |

(Continued)

FOREIGN PATENT DOCUMENTS

WO   0040027 A1   7/2000

*Primary Examiner* — Craig C Dorais
(74) *Attorney, Agent, or Firm* — Haley Guiliano LLP

(57) ABSTRACT

Methods and systems for a media guidance application that provides advanced parental control features such as allowing parents to establish parental controls in a dynamic and individualized manner and allowing parents to track and/or limit the amount of time that a child views media content of a particular type.

27 Claims, 10 Drawing Sheets

(56) References Cited

U.S. PATENT DOCUMENTS

| | | |
|---|---|---|
| 9,148,698 B1 | 9/2015 | Jaini et al. |
| 9,172,705 B1 | 10/2015 | Kong et al. |
| 9,830,467 B1 | 11/2017 | Harold |
| 9,973,502 B2 | 5/2018 | Gupta et al. |
| 9,996,587 B1 | 6/2018 | Price |
| 10,127,398 B2 | 11/2018 | Gupta et al. |
| 2002/0003948 A1 | 1/2002 | Hinneno et al. |
| 2002/0174430 A1 | 11/2002 | Ellis et al. |
| 2002/0184344 A1 | 12/2002 | Elvanoglu |
| 2003/0093792 A1 | 5/2003 | Labeeb et al. |
| 2003/0110499 A1 | 6/2003 | Knudson et al. |
| 2003/0131073 A1 | 7/2003 | Lucovsky |
| 2004/0143590 A1 | 7/2004 | Wong et al. |
| 2004/0195308 A1 | 10/2004 | Wagner et al. |
| 2004/0267669 A1 | 12/2004 | Gross |
| 2005/0223046 A1 | 10/2005 | Smith |
| 2005/0251827 A1 | 11/2005 | Ellis et al. |
| 2006/0036548 A1 | 2/2006 | Roever |
| 2006/0206912 A1 | 9/2006 | Klarfeld et al. |
| 2006/0212900 A1 | 9/2006 | Ismail et al. |
| 2006/0287956 A1 | 12/2006 | Higashi |
| 2007/0097257 A1 | 5/2007 | El-Maleh et al. |
| 2007/0204335 A1 | 8/2007 | Zugenmaier et al. |
| 2007/0212025 A1 | 9/2007 | Barton |
| 2008/0181575 A1 | 7/2008 | Girard et al. |
| 2009/0171762 A1 | 7/2009 | Alkove et al. |
| 2010/0058072 A1 | 3/2010 | Teow |
| 2010/0174608 A1 | 7/2010 | Harkness et al. |
| 2011/0029565 A1 | 2/2011 | Estevez et al. |
| 2011/0167239 A1 | 7/2011 | Horn |
| 2011/0197251 A1 | 8/2011 | Kummer |
| 2011/0206023 A1* | 8/2011 | Cohn ............... H04W 12/08 370/338 |
| 2012/0166520 A1 | 6/2012 | Lindsay et al. |
| 2012/0278828 A1 | 11/2012 | Yazdani et al. |
| 2013/0013701 A1 | 1/2013 | Cherukuri et al. |
| 2013/0122934 A1 | 5/2013 | Branch et al. |
| 2013/0204908 A1 | 8/2013 | Gehani |
| 2014/0067833 A1 | 3/2014 | Nandi et al. |
| 2014/0130092 A1 | 5/2014 | Kunisetty |
| 2014/0130099 A1 | 5/2014 | Kunisetty |
| 2014/0149424 A1 | 5/2014 | Kalmes et al. |
| 2014/0282656 A1 | 9/2014 | Belyaev et al. |
| 2014/0283140 A1 | 9/2014 | Gorman |
| 2014/0344951 A1 | 11/2014 | Brewer |
| 2015/0052201 A1 | 2/2015 | Brooks et al. |
| 2015/0106122 A1 | 4/2015 | Lee et al. |
| 2015/0227611 A1 | 8/2015 | Bao et al. |
| 2015/0242750 A1 | 8/2015 | Anderson et al. |
| 2015/0245095 A1 | 8/2015 | Gonzalez |
| 2015/0273340 A1 | 10/2015 | Cudak et al. |
| 2015/0293916 A1 | 10/2015 | Paglia et al. |
| 2015/0312609 A1 | 10/2015 | Hoctor et al. |
| 2016/0048866 A1 | 2/2016 | Li |
| 2016/0098323 A1 | 4/2016 | Mutha |
| 2016/0191534 A1 | 6/2016 | Mallozzi |
| 2016/0212494 A1 | 7/2016 | Yang et al. |
| 2016/0259790 A1 | 9/2016 | Mashiach et al. |
| 2016/0335424 A1 | 11/2016 | Hampson et al. |
| 2016/0335683 A1 | 11/2016 | Roberts |
| 2016/0345187 A1 | 11/2016 | Adderly et al. |
| 2017/0083715 A1 | 3/2017 | Gupta et al. |
| 2017/0085569 A1 | 3/2017 | Gupta et al. |

\* cited by examiner

600

```
600 ...
601 Initialization Subroutine
602 ...
603 //Routine to generate statistical relationship based on media asset consumption :
604
605 Receive instances of criteria
606 For each instance of criteria:
607    A = Accessed value of the criterion
608    B = Accessed value of data related to media asset
609        If (Abs(A-B)<=tolerance)
610            Execute Subroutine to increase counter amount corresponding to
       the criterion using processing circuitry
611 ...
612 Termination Subroutine
613 ...
```

```
800 ...
801 Initialization Subroutine
802 ...
803 //Routine to retrieve criteria of program types:
804
805 Receive instances of criteria for program types
806 For each instance criterion:
807     Query database containing data related to media asset for entries matching criterion
808         If (Number of matching entries > 0)
809             Retrieve value of media asset from database entries matching criterion
810             Execute Subroutine to increase counter amount corresponding to criterion using processing circuitry
811         Else If (Number of similar entries > 0)
812             Execute Subroutine to do not increase counter amount corresponding to criterion using processing circuitry
813 ...
814 Termination Subroutine
815 ...
```

FIG. 8

METHODS AND SYSTEMS FOR IMPLEMENTING PARENTAL CONTROLS

CROSS-REFERENCE TO RELATED APPLICATIONS

This application is a continuation of U.S. patent application Ser. No. 17/089,225, filed Nov. 4, 2020, which is a continuation of U.S. patent application Ser. No. 16/158,046, filed Oct. 11, 2018, now U.S. Pat. No. 10,860,736, which is a continuation of U.S. patent application Ser. No. 14/858,255, filed Sep. 18, 2015, now U.S. Pat. No. 10,127,398. The disclosures of which are hereby incorporated by reference herein in their entireties.

BACKGROUND

In conventional systems, users may access media content from a plurality of sources. In some cases, media content from a particular source or of a particular type may not be appropriate for all viewers. For example, media content featuring violence may not be appropriate for children under a particular age. To prevent viewers from viewing objectionable content, many media systems include parental control features. Such parental control features often allow a user (e.g., a parent of a child) to block media content based on one or more criteria (e.g., a source of the media content, a content rating of the media content, etc.). While such systems are helpful in blocking media content of a particular type, such systems do not allow for the flexibility needed to differentiate content in a dynamic, individualized manner, nor do such systems allow for limiting a viewer's expose to media content to a predetermined length of time (e.g., two hours a week).

SUMMARY

Accordingly, methods and systems are disclosed herein for a media guidance application that provides advanced parental control features. As described herein, these advanced parental control features may allow parents to establish parental controls in a dynamic and individualized manner. Moreover, these advanced parental control features may allow parents to track and/or limit the amount of time that a child views media content of a particular type.

For example, the media guidance application may access information in a user profile associated with a user to determine criteria for use in determining whether or not a media asset is being consumed for entertainment or educational purposes. As the criteria are based on information in a user profile, the criteria may change as the information in a user profile changes. For example, if the information indicates that a user is currently in culinary school, the criteria for educational programming may include whether or not the media asset relates to cooking. Moreover, if the information is updated (e.g., after the user leaves culinary school and enrolls in an engineering program), the criteria for educational programming may now include whether or not the media asset relates to engineering. Likewise, the criteria for entertainment programming may now include all programming other than media assets related to engineering (including media assets related to cooking). By determining the criteria for different program types based on information in a user profile, the media guidance application may provide dynamic and individualized parental control features, as opposed to parental control features that are based on static generic criteria such as source or content rating.

The media guidance application may also track and/or limit the amount of time spent consuming one or more types of media content. For example, the media guidance application may provide statistical analysis of the programming choices of a child in order to alert a parent of the amount of educational media asset consumed by a child relative to the amount of non-educational media assets. By providing a statistical analysis of the programming choices of the child, the media guidance application provides an intuitive snapshot of the media assets consumed by the child, relieving the parent of the burden of a manual analysis. Moreover, by providing this information in an intuitive format, a parent may more competently assess and/or modify a child's programming choices.

In another example, the media guidance application may relieve a first user (e.g., a parent) of the burden of continually monitoring the statistical analysis (e.g., a ratio) of the programming choices of a second user (e.g., a child) by establishing one or more threshold analyses (e.g., a threshold ratio) that the media guidance application may automatically compare to the statistical analysis of the programming choices of the second user. For example, in response to determining that the ratio of education programming to entertainment programming for the second user is lower than that of the peers of the second user, the media guidance application may block the second user from consuming entertainment programming and/or alert the first user.

In some aspects, a media guidance application (e.g., implemented on a user device) may retrieve a first criterion for a first program type. For example, the media guidance application may retrieve a user profile from memory, in which the user profile indicates an educational or professional interest for a first user. For example, information in the user profile may indicate the current educational or professional goals of the first user. The media guidance application may process this information to generate criteria for a first program type (e.g., educational programs). The media guidance application may also retrieve a second criterion for a second program type. For example, the media guidance application may process information in the user profile to generate criteria for a second program type (e.g., non-educational programs). For example, whereas information about a current occupation, a current school curriculum, or a business opportunity may be used to generate the first criterion, other information (e.g., social media posts, media viewing history, etc.) may be used to generate criteria for the second program type.

The media guidance application may then detect a media asset being consumed by the first user and compare the media asset to the first criterion and the second criterion. For example, the media guidance application may apply parental controls in response to detecting that the first user is consuming media assets. When applying the parental controls, the media guidance application may compare media assets being consumed by a user (or data about those media assets) to the criteria corresponding to different program types to determine whether or not the media asset corresponds to a particular program type. For example, the media guidance application may continuously compare media assets to the ever-changing information in the user profile to categorize media content in a dynamic and individualized manner.

The media guidance application may then, in response to determining that the media asset corresponds to the first criterion, add a time value corresponding to a play length of the media asset to a first counter amount, in which the first counter amount indicates a total amount of time the first user consumed media assets of the first program type. For example, after categorizing media content in a dynamic and individualized manner, the media guidance application may track the amount of time the first user spends consuming media content of a particular type. For example, the media guidance application may notify a second user (e.g., a parent of the first user) in response to determining that the first counter amount equals or exceeds a threshold amount (e.g., a maximum amount of time that the second user allows the first user to consume media content of the particular type). For example, the second user may then determine whether or not to block the media content. In some embodiments, the media guidance application may provide other motivational mechanisms related to the threshold amount. For example, the media guidance application may generate, for display, to the first user a recommendation for an activity (e.g., completing homework, exercising, etc.) and, in response to determining that the first user has completed the activity, increasing the threshold amount (e.g., allowing the first user to consume more media content of a particular type).

The media guidance application may then retrieve a second counter amount from memory, in which the second counter amount indicates the total amount of time the first user consumed media assets of the second program type. For example, the first counter may track the amount of time that the first user has consumed educational media content and the second counter may track the amount of time that the first user has consumed non-educational media content.

The media guidance application may then generate for display a statistical analysis of a relationship between the first counter amount and the second counter amount. For example, the statistical analysis of the relationship between the first counter amount and the second counter amount may be a ratio of the amount of time the first user spent consuming educational media content to the amount of time the first user spent consuming non-educational media content. By generating the statistical analysis of a relationship between the first counter amount and the second counter amount, the media guidance application may provide a second user (e.g., a parent) with information upon which the second user can easily understand the viewing habits of the first user (e.g., a child). For example, the media guidance application may store the statistical analysis for review by the second user and/or transmit the statistical analysis to another device for review by the second user.

In some embodiments, the media guidance application may determine a program type for all available media content in order to provide additional features to the first user. For example, the media guidance application may receive, from the first user, a user input requesting media content of the first program type (e.g., educational media content), and, in response to the user input, generate for display a listing for the media asset.

In some embodiments, the media guidance application may identify the first user, and, in response to identifying the first user, search a database of counter amounts associated with the first user to determine the first counter amount and the second counter amount. For example, the media guidance application may store user profiles and counters that are individualized for a plurality of users. Through the use of one or more user authentication mechanisms, the media guidance application may determine which user is currently consuming media content and retrieve/update only the user profile and/or counters corresponding to that user.

In some embodiments, the media guidance application may publish the statistical analysis. For example, the media guidance application may post the statistical analysis to a social media network in order to motivate the first user to view media content of a particular type (e.g., educational media content).

In some aspects, the media guidance application may determine a statistical analysis of a relationship between a first program type and a second program type for a first user. For example, the media guidance application may determine a first ratio of a total amount of time the first user consumed media assets of the first program type (e.g., entertainment) to a total amount of time the first user consumed media assets of the second program type (e.g., education).

The media guidance application may access a social network. For example, the media guidance application may access a database of information corresponding to a user group of the first user's peers. For example, by using information related to the peers of the first user, the media guidance application may develop parental controls that are in line with the social norms and mores of the users.

The media guidance application may locate a user group on the social network associated with the first user. For example, the media guidance application may retrieve contacts (e.g., "friends") of an account (e.g., a social network profile) for the first user on the social network (e.g., in order to ensure that the users in the user group share the same social norms and mores as the first user). In another example, the media guidance application may match demographic information of the first user to demographic information for each user of the user group (e.g., to ensure that the users in the user group are of the same age as the first user). In another example, the users in the user group may be selected by the second user (e.g., in order to ensure that the threshold analysis is based on users that are approved by a parent of the first user).

The media guidance application may determine a threshold analysis of a relationship between the first program type and the second program for an average user of the user group. For example, the threshold analysis may be a second ratio of a total amount of time the average user of the user group consumed media assets of the first program type to a total amount of time the average user of the user group consumed media assets of the second program type.

The media guidance application may compare the statistical analysis to the threshold analysis. For example, the media guidance application may determine whether or not the statistical analysis exceeds the threshold analysis (e.g., whether a ratio of a total amount of time the first user consumed media assets of the first program type to a total amount of time the first user consumed media assets of the second program type exceeds that of a ratio of a total amount of time the average user of the user group consumed media assets of the first program type to a total amount of time the average user of the user group consumed media assets of the second program type.

The media guidance application may then perform one or more actions based on the comparison. For example, the media guidance application may block the first program type or alert a second user (e.g., a parent of the first user) based on the comparison. For example, in response to determining that a ratio of a total amount of time the first user consumed media assets of the first program type to a total amount of time the first user consumed media assets of the second program type exceeds that of a ratio of a total amount of time the average user of the user group consumed media assets of the first program type to a total amount of time the average user of the user group consumed media assets of the second program type, the media guidance application may automatically block the first user from consuming any more media assets of the first program type.

In some embodiments, the media guidance application may determine the threshold analysis in real time or on a periodic basis in order to ensure that the threshold analysis is current. For example, the threshold analysis may differ based on a month (e.g., whether or not school is in session), a time of year (e.g., summer versus winter), or on a particular day (e.g., a weekend day versus a school day).

In some embodiments, the media guidance application may also modify the threshold analysis based on information received from a data source selected by the second user. For example, a parent may wish to receive updates on the progress of a child at school or at a part-time job. If the parent notices that the child is performing well at school or at a job, the parent may wish to allow a child to have a higher ratio of entertainment programs to education programs. In contrast, if the parent notices that the child is performing poorly at school or at a job, the parent may wish to allow a child to have a lower ratio of entertainment programs to education programs.

It should be noted that the systems, methods, apparatuses, and/or aspects described above may be applied to, or used in accordance with, other systems, methods, apparatuses, and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is pseudocode of illustrative steps for increasing a counter amount in accordance with some embodiments of the disclosure;

FIG. 8 is pseudocode of an illustrative process for using a database to increase a counter amount in accordance with some embodiments of the disclosure;

DETAILED DESCRIPTION

Figure 1:
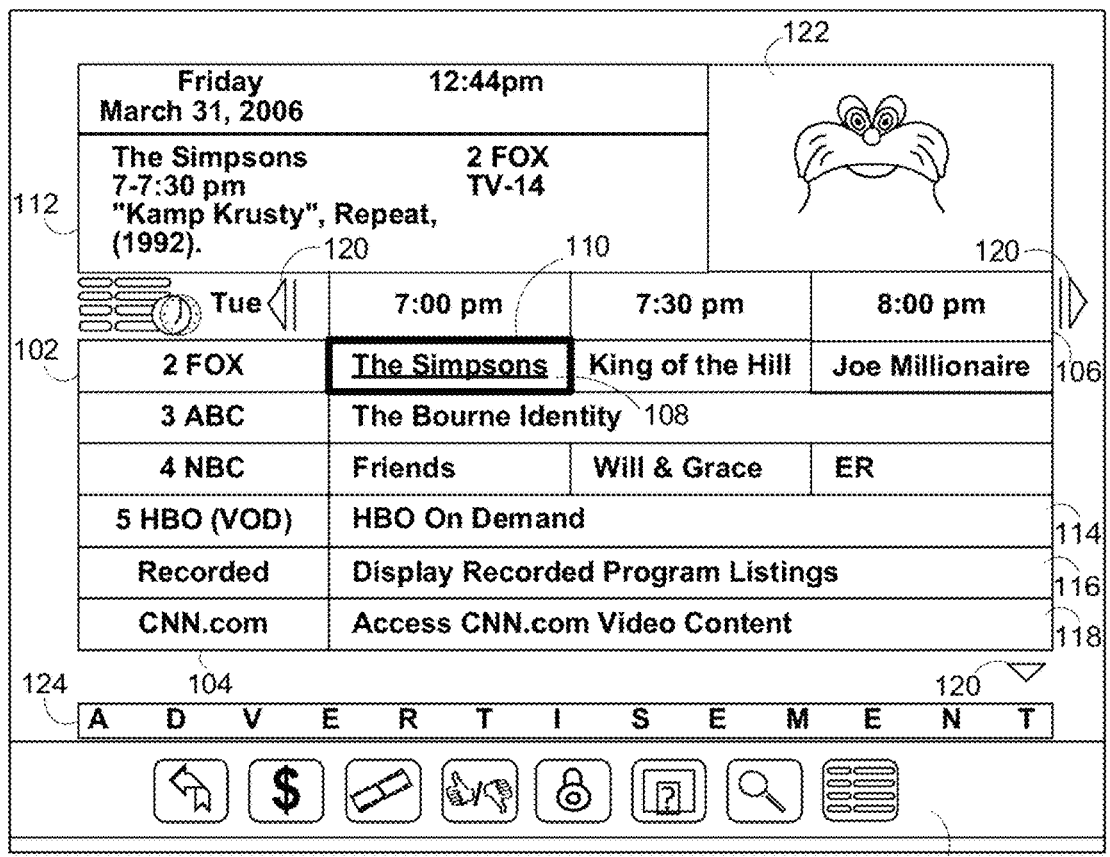
FIG. 1 shows an illustrative example of a display screen generated by a media guidance application in accordance with some embodiments of the disclosure.

Methods and systems are disclosed herein for a media guidance application that provides advanced parental control features. As described herein, these advanced parental control features may allow parents to establish parental controls in a dynamic and individualized manner. Moreover, these advanced parental control features may allow parents to track and/or limit the amount of time that a child views media content of a particular type.

As referred to herein, a "media guidance application," or simply a "guidance application" is an application that allows users to efficiently navigate content selections and easily identify content that they may desire through an interface. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

The media guidance application may access information in a user profile associated with a user to determine criteria for use in determining whether or not a media asset is being consumed for entertainment or educational purposes. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above; for example, text, audio, images, video, or interactivity content forms. Content may be recorded, played, displayed or accessed by user equipment devices, but can also be part of a live performance.

As referred to herein, a "user profile" refers to a collection of information about a particular user. The information may include any information needed to determine the educational, non-educational, professional, non-professional, and/or any other interest of a user. For example, the information contained in the user profile may include demographic, geographic, or other information about the user or a group to which the user belongs. In another example, the information may be related to media content consumed by a user such as a viewing history, purchase history, recommendations, "liked" content, etc. In yet another example, the information may relate to activities of the user such as the current job, school, area of study, calendar information, etc. In yet another example, the information in the user profile may include responses from the user to queries about the user's interests. This information may then be processed by the media guidance application to determine criteria for categorizing media content.

As referred to herein, a "criterion" or "criteria" may be any characteristic or group of characteristics that distinguishes one group of media assets from another. For example, a criterion may relate to a genre, source, subject matter, and/or any other media guidance data related to the media asset. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information; parental control ratings, critic's ratings, etc.; genre or category information, actor information; logo data for broadcasters' or providers' logos, etc.; media format (e.g., standard definition, high definition, 3D, etc.); advertisement information (e.g., text, images, media clips, etc.)), on-demand information, blogs, websites, and any other type of guidance data that is helpful for a user to navigate among and locate desired content selections.

For example, if one group of media assets is related to education, a criterion for including a media asset in that group may be whether or not the media asset relates to the educational interests of the user. For example, media assets featuring subject matter that corresponds to the educational interest, media assets associated with a curriculum of an educational program, and/or media assets provided by an educational source may all meet this criteria. In contrast, media assets featuring subject matter that corresponds to the non-educational interest, media assets not associated with a curriculum of an educational program, and/or media assets provided by a non-educational source may all fail to meet this criteria.

In another example, if one group of media assets is related to a profession of a user, a criterion for including a media asset in that group may be whether or not the media asset relates to the professional interests of the user. For example, media assets featuring subject matter that corresponds to the current or future employment of the user, media assets associated with a job training program, and/or media assets provided by an employer may all meet this criteria. In contrast, media assets featuring subject matter that corresponds to the non-professional interest, media assets not associated with a job training program, and/or media assets not provided by an employer may all fail to meet this criteria.

The media guidance application may continuously, or according to a predetermined schedule, update the criteria used to categorize media assets. The criteria may change as the information in a user profile changes. For example, if the information indicates that a user is currently employed as a mechanic, the criteria for professional programming may include whether or not the media asset relates to automobiles. Moreover, if the information is updated (e.g., after the user leaves the mechanic job to open a restaurant), the criteria for professional programming may now include whether or not the media asset relates to food. By determining the criteria for different program types based on information in a user profile, the media guidance application may provide dynamic and individualized parental control features, as opposed to parental control features than are based on static generic criteria such as source or content rating.

The media guidance application may categorize media assets into a plurality of categories which is not limited to an particular number or type. For example, in addition to the educational and professional categories discussed above, the media guidance application may include any other program types. The individual program type may be as varied as the criterion and/or criteria upon which they are based.

As users consume media assets, the media guidance application may continually determine what program types have been consumed. For example, the media guidance application may include a counter or other tracking mechanism that is updated as a user views media content. The counter may track the number of media assets of a particular type, the total length of all media assets of a particular type, etc. For example, the counter may track the number of media assets of a particular type that a user has consumed and/or the length of time a user has spent consuming media assets of a particular type.

The media guidance application may additionally or alternatively receive information for remote locations that includes information used to categorize programs. For example, the media guidance application may weigh the characteristics of different media assets in order to put the media assets into one program category or another. For example, the media guidance application may determine to what degree a particular media asset is educational (e.g., either based on a qualitative or quantitative metric). The degree to which the media asset is educational may factor into how the media guidance application adjusts a counter for educational programs.

For example, the media guidance application may compare the age of a user, the profession of the user, etc. to metadata about a particular media asset. For example, every time the user views a particular media asset, the media guidance application may adjust the educational and entertainment "points" associated with the user account for the user.

For example, the media guidance application may adjust a counter associated with a first program type for a first user (e.g., a two-year-old child) differently than a counter associated with a second user (e.g., a teenager) after each user views a media asset because the educational and/or entertainment value of that media asset to the users is different. For example, the media guidance application may consider a media asset featuring basic math to be of more educational value to the first user than the second user.

The media guidance application may also track and/or limit the amount of time spent consuming one or more types of media content. For example, the media guidance application may provide statistical analysis of the programming choices of a child in order to alert a parent of the amount of educational media asset consumed by a child relative to the amount of non-educational media assets. By providing a statistical analysis of the programming choices of the child, the media guidance application provides an intuitive snapshot of the media assets consumed by the child, relieving the parent of the burden of a manual analysis. Moreover, by providing this information in an intuitive format, a parent may more competently assess and/or modify the child's programming choices.

As referred to herein, a "statistical analysis" may refer to any collection, analysis, interpretation, presentation, and organization of data. For example, a statistical analysis of a statistical analysis of a relationship between the first counter amount and the second counter amount may include a ratio, a graph, a fraction, percentage, and/or any other expression.

In some embodiments, the media guidance application may be implemented on a user device. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens.

In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices.

The media guidance application may also access storage circuitry to retrieve the criteria. For example, the media guidance application may retrieve a user profile from memory, in which the user profile indicates an educational or professional interest for a first user. For example, information in the user profile may indicate the current educational or professional goals of the first user. The media guidance application may process this information to generate criteria for a first program type (e.g., educational programs). The media guidance application may also retrieve a second criterion for a second program type. For example, the media guidance application may process information in the user profile to generate criteria for a second program type (e.g., non-educational programs). For example, whereas information about a current occupation, a current school curriculum, or a business opportunity may be used to generate the first criterion, other information (e.g., social media posts, media viewing history, etc.) may be used to generate criteria for the second program type.

The media guidance application may then detect a media asset being consumed by the first user and compare the media asset to the first criterion and the second criterion. For example, the media guidance application may apply parental controls in response to detecting that the first user is consuming media assets. When applying the parental controls, the media guidance application may compare media assets being consumed by a user (or data about those media assets) to the criteria corresponding to different program types to determine whether or not the media asset corresponds to a particular program type. For example, the media guidance application may continuously compare media assets to the ever-changing information in the user profile to categorize media content in a dynamic and individualized manner.

For example, the media guidance application may determine that a user has accessed and/or selected a media listing as shown in FIG. 1. FIG. 1 shows an illustrative display screen that may be used to provide media guidance data. The display screen shown in FIG. 1 may be implemented on any suitable user equipment device or platform. While the display of FIG. 1 is illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to, or be unrelated to, one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting a program and/or a channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

In some embodiments, the media guidance application may, in response to determining that a currently viewed and/or selected media asset corresponds to a first criterion, add a time value corresponding to a play length of the media asset to a first counter amount, in which the first counter amount indicates a total amount of time the first user consumed media assets of the first program type. For example, after categorizing media content in a dynamic and individualized manner, the media guidance application may track the amount of time the first user spends consuming media content of a particular type. For example, the media guidance application may notify a second user (e.g., a parent of the first user) in response to determining that the first counter amount equals or exceeds a threshold amount (e.g., a maximum amount of time that the second user allows the first user to consume media content of the particular type). For example, the second user may then determine whether or not to block the media content. In some embodiments, the media guidance application may provide other motivational mechanisms related to the threshold amount. For example, the media guidance application may generate for display, to the first user, a recommendation for an activity (e.g., completing homework, exercising, etc.) and in response to determining that the first user has completed the activity, increasing the threshold amount (e.g., allowing the first user to consume more media content of a particular type).

As referred to herein, a "threshold" refers to a data point used by the media guidance application to trigger an action. For example, the threshold may constitute a particular value (e.g., an amount, a length of time, etc.). In some embodiments, the threshold may refer to a statistical analysis of a relationship between different data sets. For example, in some embodiments, the media guidance application may compare a length of time that a user has consumed media assets of a particular type to a threshold amount to determine whether or not to trigger an action (e.g., blocking programming, alerting another user, etc.). Alternatively or additionally, the media guidance application may compare a statistical analysis of a relationship between a first program type and a second program type for a first user to a threshold analysis to determine whether or not to trigger an action (e.g., blocking programming, alerting another user, etc.). For example, the threshold analysis may constitute data describing a statistical analysis of a relationship between a first program type and a second program type for a different user or users.

For example, in some embodiments, the "threshold" may be based on a group of users. For example, the media guidance application may retrieve data on how much programming of a given program type other users are consuming. The media guidance application may then use this information and/or may generate a statistical analysis of that information.

In some embodiments, the media guidance application may also modify the threshold based on information received from one or more data sources. For example, the particular threshold used for any one comparison may be keyed to information other than the viewing habits of a particular user or users. For example, the media guidance application may retrieve data that indicates whether or not a user has performed a particular activity and/or the level of proficiency of the user at that activity.

In some embodiments, the media guidance application may allow a user (e.g., a parent) to select the activities and/or data sources that are used to modify a threshold. For example, a parent may wish to receive updates on the progress of a child at school or at a part-time job. Accordingly, the media guidance application may access a data source of school progress information (e.g., a database of test scores for a child). If the parent notices that the child is performing well at school or at a job, the parent may wish to allow a child to have a higher ratio of entertainment programs to education programs. Accordingly, the media guidance application may automatically or in response to a user input modify the thresholds used in any one comparison.

As referred herein, the term "in response to" refers to initiated as a result of. For example, a first action being performed in response to another action may include interstitial steps between the first action and the second action. As referred herein, the term "directly in response to" refers to "caused by." For example, a first action being performed directly in response to another action may not include interstitial steps between the first action and the second action.

In some embodiments, the media guidance application may retrieve a second counter amount from memory, in which the second counter amount indicates a total amount of time the first user consumed media assets of the second program type. For example, the first counter may track the amount of time that the first user has consumed educational media content and the second counter may track the amount of time that the first user has consumed non-educational media content.

Figure 2:
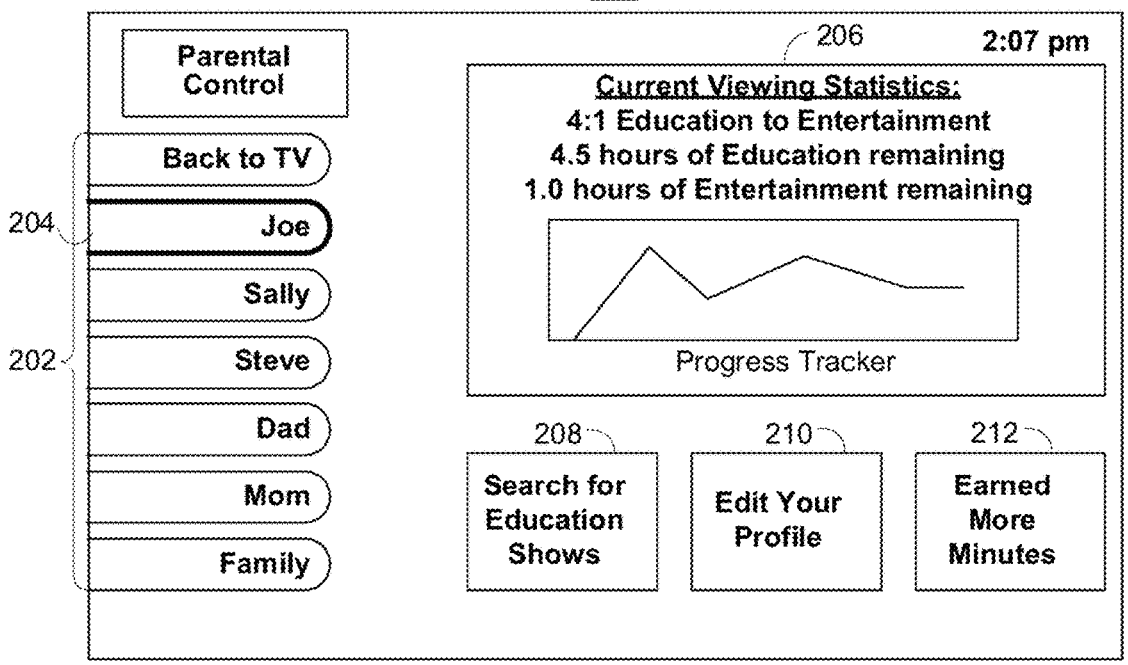
FIG. 2 shows another illustrative example of a display screen generated by a media guidance application for interacting with parental control features in accordance with some embodiments of the disclosure.

Another display arrangement for providing media guidance is shown in FIG. 2. Video mosaic display 200 includes selectable options 202 for parental controls for individual users (e.g., "Joe," "Sally," "Steve," "Dad," and "Mom") and a group of users (e.g., "Family). In display 200, option 204 is selected, thus providing parental control information and a statistic analysis for a first user (e.g., "Joe"). In display 200 the content may include graphical images including cover art, still images from the content, video clip previews, live video from the content, or other types of content that indicate to a user the content being described by the media guidance data in the listing. Each of the graphical listings may also be accompanied by text to provide further information about the content associated with the listing. In some embodiments, the media guidance application may allow a second user (e.g., a parent) to access display 200 to obtain a statistical analysis and/or edit parental controls related to a first user (e.g., a child).

The media guidance application provides window 206, which includes current statistics related to what media content has been consumed by the first user. For example, window 206 includes a ratio of education programming viewed by the first user to entertainment programming, includes the amount of time remaining that the first user may consume media content from different categories, and a graph indicating the viewing consumption of the user.

The media guidance application also provides other windows. For example, window 208 provides an option for searching for media assets that correspond to a particular program type. For example, the media guidance application may allow a use to search for media assets that correspond to a particular criterion and/or filter available media listings by that criterion.

Window 210 provides an option for updating a user profile. For example, the media guidance application may receive user input indicating the current educational or professional interests. Alternatively or additionally, the media guidance application may allow a user to upload a curriculum, resume, calendar, etc. that includes information from which the media guidance application may automatically determine a criterion for a particular category. The media guidance application may also receive selections and/or descriptions of requested program types.

In some embodiments, window 210 may allow a user to enter one or more inputs that describe what thresholds should be applied to a particular user and/or what data should be used to generate a threshold. For example, the media guidance application may receive a user input authorizing the media guidance application to retrieve school and/or work progress information. The media guidance application may then use that information to modify one or more thresholds.

The media guidance application may also allow a user to select particular settings related to a threshold. For example, the media guidance application may select a user group, demographic, or particular users that may be used to generate a threshold analysis (e.g., as described in FIG. 10 below).

The media guidance application may also allow a user to enter settings for how often or when a threshold is computed. For example, the media guidance application may receive a user input to dynamical (e.g., in a real-time and/or continuous basis) determine a threshold. For example, the media guidance application may determine the threshold in real time or on a periodic basis in order to ensure that the threshold is current. For example, the threshold may differ based on a month (e.g., whether or not school is in session), a time of year (e.g., summer versus winter), or on a particular day (e.g., a weekend day versus a school day).

Window 212 provides options for earning more minutes of viewing time for a particular program type. For example, the media guidance application may provide other motivational mechanisms related to the threshold amount. For example, the media guidance application may generate, for display, to the first user a recommendation for an activity (e.g., completing homework, exercising, etc.) and in response to determining that the first user has completed the activity, increasing the threshold amount (e.g., allowing the first user to consume more media content of a particular type).

In some embodiments, the media guidance application may publish the statistical analysis. For example, the media guidance application may post the statistical analysis or other information available in display 200 to a social media network in order to motivate the first user to view media content of a particular type (e.g., educational media content). For example, the media guidance application may retrieve a list of entities such as friends (e.g., a social network buddy list), contacts (e.g., retrieved from a phone/text message/e-mail account associated with the user), and/or public services (e.g., hospitals, police departments, schools, etc.) with known associations to the user or the community of the user and generate for display information (e.g., a post content) on a social network.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user.

In some embodiments, the media guidance application may use a social network to select a user group. As referred to herein, a "user group" refers to any grouping of users. For example, a user group may include users with a common characteristic (e.g., an age, geographic location, etc.) or may include users that were randomly or intentionally selected. In some embodiments, a user group may include information related to one or more users that is pulled and/or gathered from one or more sources. For example, a user group may include data that is provided as part of industry research, random polling, identified trends, etc., whether or not the information is attributed to an identifiable user.

In some embodiments, the media guidance application may present a dashboard that includes statistics with time, channel number, genre, educational value, entertainment value, professional value, etc. and others of the programs being watched. The media guidance application may also allow users to manage the viewing habits, set goals, set restrictions, set triggers to improve the quality of the programs other users (e.g., children) view. In addition, the media guidance application may alert a user (e.g., a parent) if, for a period of time, the set goals are not being met or under risk of not being met. The media guidance application may also send appropriate digests (e.g., via SMS, email, social networking and/or messaging tools, etc.) to routinely keep the user (e.g., a parent) up to date on the progress on certain goals.

Figure 3:
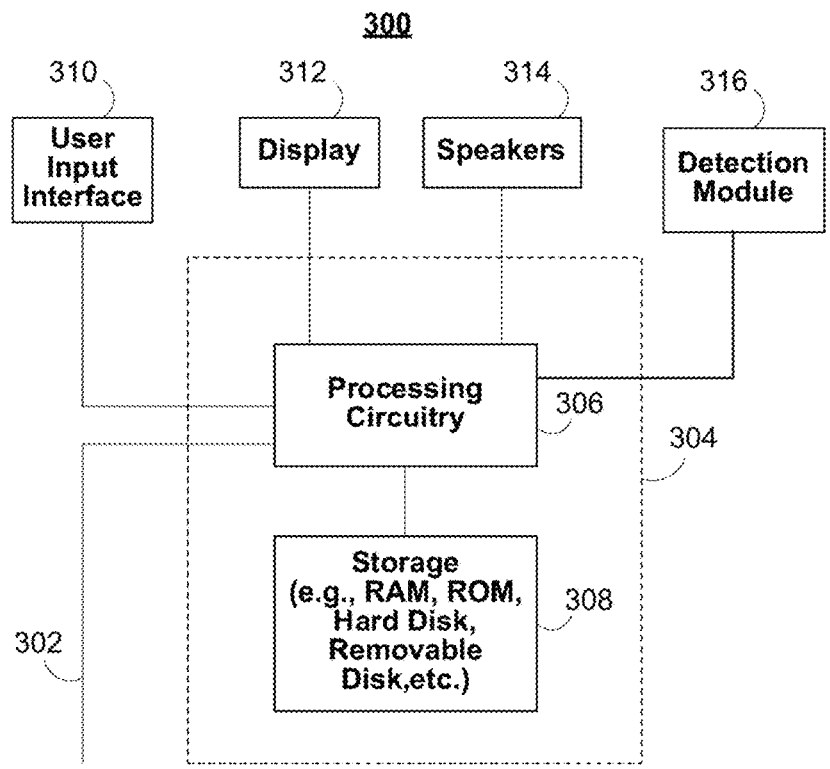
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and, specifically, processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. Storage 308 may be used to store various types of content described herein, as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also incorporate or be accessible to detection module 316. Detection module 316 may further include various components (e.g., a video detection component, an audio detection component, object recognition module, a global positioning system component, a motion detecting component, etc.). In some embodiments, detection module 316 may include components that are specialized to generate particular information (e.g., identifying a user currently interacting with the media guidance application).

In some embodiments, detection module 316 may include a content recognition module. The content recognition module may use object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique to monitor the movements (or lack thereof) of one or more users. For example, the media application may receive data in the form of a video of the user. The video may include a series of frames. For each frame of the video, the media application may use a content recognition module or algorithm to identify the facial features of a user.

In some embodiments, the content recognition module or algorithm may also include speech recognition techniques, including, but not limited to, Hidden Markov Models, dynamic time-warping, and/or neural networks (as described above) to translate spoken words into text and/or processing audio data. The content recognition module may also combine multiple techniques to determine the interaction of a user and/or the content of a media asset. For example, the media guidance application may determine whether or not a user is speaking and/or about what the user is speaking. For example, the media guidance application may interpret voice commands and/or identify a user based on voice authorization features.

It should be noted that detection module 316 may, in some embodiments, be located on a separate device in communication with the device upon which a media guidance application (and control circuitry 304) is implemented. For example, in some embodiments, detection module 316 may communicate with user device 300 via a communications network (e.g., communications network 414 (FIG. 4)).

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
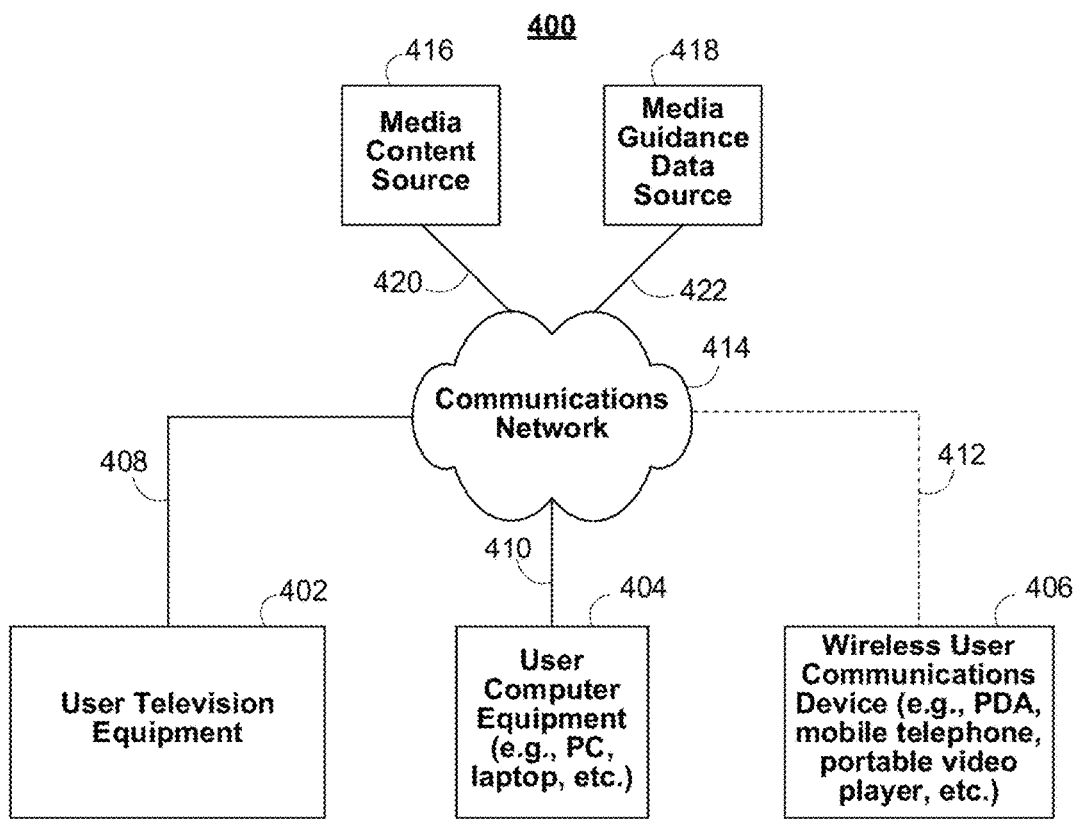
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website, www.allrovi.com, on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify which sources or services a given user subscribes to and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates the likelihood that a given user will terminate access to a service/source. For example, the media guidance application may process the viewer data with the subscription data using the model to generate a value or score that indicates the likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or as a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
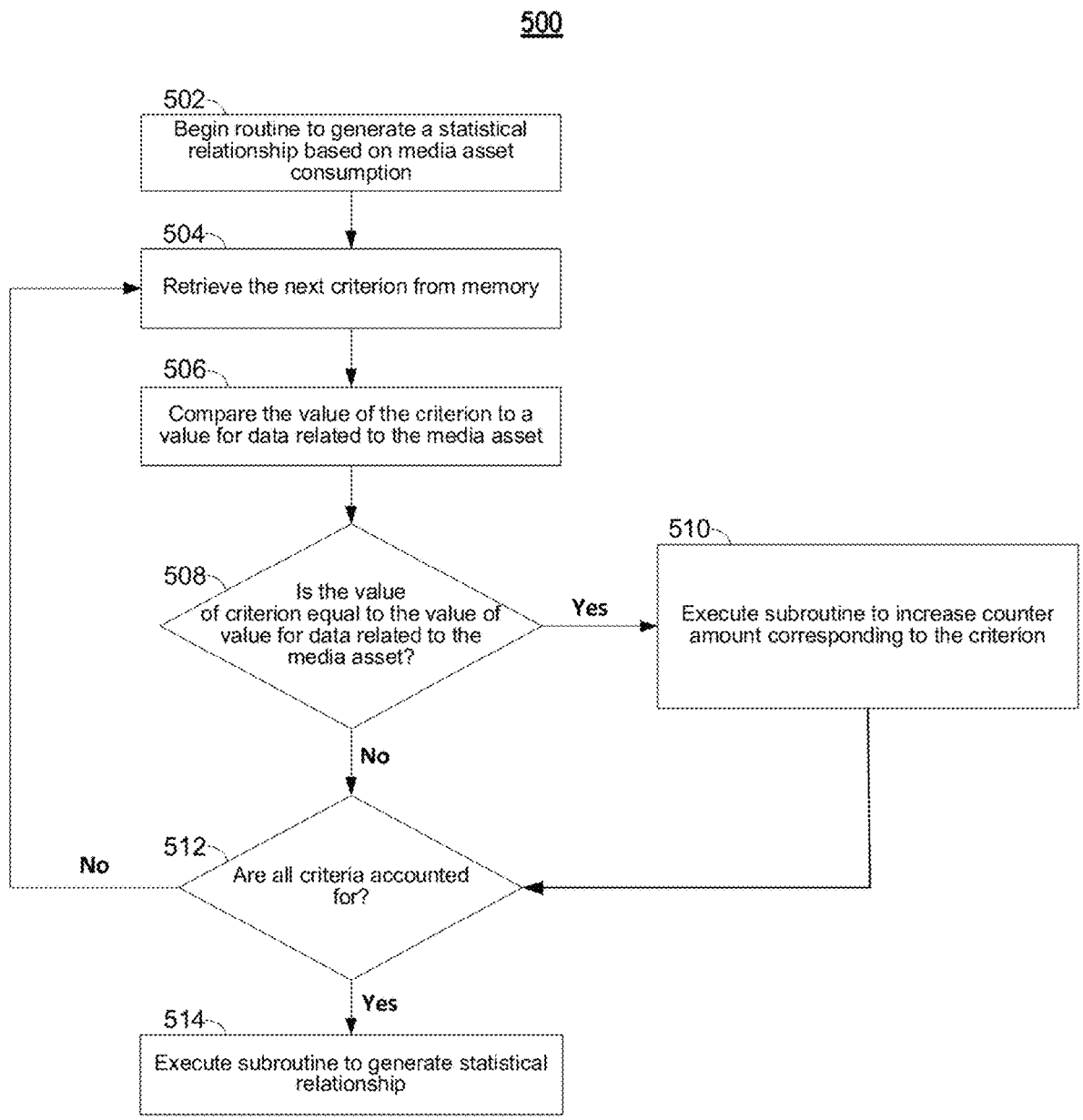
FIG. 5 is a flowchart of illustrative steps for increasing a counter amount in accordance with some embodiments of the disclosure.

FIGS. 5 and 6 present an algorithm for the media guidance application (e.g., via control circuitry 304 (FIG. 3)) to generate a statistical relationship based on media asset consumption in accordance with some embodiments of the disclosure. In some embodiments this algorithm may be encoded on to non-transitory storage medium (e.g., storage device 308 (FIG. 3)) as a set of instructions to be decoded and executed by processing circuitry (e.g., processing circuitry 306 (FIG. 3)). Processing circuitry may in turn provide instructions to other sub-circuits contained within control circuitry 304 (FIG. 3), such as the tuning, video generating, encoding, decoding, encrypting, decrypting, scaling, analog/digital conversion circuitry, and the like.

The flowchart in FIG. 5 describes an algorithm for the media guidance application (e.g., via control circuitry 304 (FIG. 3)) to generate statistical relationship based on media asset consumption in accordance with some embodiments of the disclosure.

At step 502, the media guidance application begins an algorithm to generate statistical relationship based on media asset consumption In some embodiments, this may be done either directly or indirectly in response to a user action or input (e.g., from signals received by control circuitry 304 (FIG. 3) or user input interface 310 (FIG. 3)). For example, the algorithm may begin directly in response to control circuitry 304 (FIG. 3) receiving signals from user input interface 310 (FIG. 3), or control circuitry 304 (FIG. 3) may prompt the user to confirm their input using a display (e.g., by generating a prompt to be displayed on display 312 (FIG. 3)) prior to running the algorithm.

At step 504, the media guidance application (e.g., via control circuitry 304 (FIG. 3)) proceeds to retrieve the next criterion from memory. In some embodiments control circuitry 304 may receive a single primitive data structure that represents the value of the next criterion. In some embodiments the value may be stored as part of a larger data structure, and control circuitry 304 (FIG. 3) may retrieve the value by executing appropriate accessor methods to retrieve the value from the larger data structure.

At step 506, the media guidance application (e.g., via control circuitry 304 (FIG. 3)) proceeds to compare the value of the criterion to a value for data related to the media asset. In some embodiments, the value of data related to the media asset may be stored (e.g., on storage device 308 (FIG. 3)) prior to beginning the algorithm. In some embodiments, the value of data related to the media asset may also be retrieved for each and every criterion. In some embodiments, control circuitry 304 (FIG. 3) may directly compare the value of the criterion with the value of the data related to the media asset by accessing the values respectively from memory and performing a value comparison. In some instances, control circuitry 304 (FIG. 3) may call a comparison function (e.g., for object-to-object comparison) to compare the value of the criterion with the value of the data related to the media asset.

At step 508, the media guidance application (e.g., via control circuitry 304 (FIG. 3)) compares the values of the criterion and the value of the data related to the media asset to determine if the value of criterion is equal to the value of the data related to the media asset. If the condition is satisfied, the media guidance application proceeds to step 510; if the condition is not satisfied, the media guidance application proceeds to step 512 instead.

At step 510, the media guidance application (e.g., via control circuitry 304 (FIG. 3)) will execute a subroutine to increase counter amount corresponding to the criterion based on the condition at step 508 being satisfied. For example, the media guidance application may increase the number of the counter by one (e.g., indicating that the user has consumed a media asset of the particular type). In another example, the media guidance application may determine the play length of the media asset and increase the counter by that amount (e.g., indicating the amount of time the user has consumed media assets of the particular type). After the subroutine is executed, the media guidance application proceeds to step 512.

At step 512, the media guidance application (e.g., via control circuitry 304 (FIG. 3)) determines whether or not all criteria are accounted for. If the condition is satisfied, the algorithm may proceed to step 514; if the condition is not satisfied, the media guidance application proceeds to step 504 instead and retrieves the next criterion from memory.

At step 514, the media guidance application (e.g., via control circuitry 304 (FIG. 3)) will execute a subroutine to generate statistical relationship based on the condition of step 512 being satisfied. For example, the media guidance application may generate for display window 206 (FIG. 2).

It is contemplated that the descriptions of FIG. 5 may be used with any other embodiment of this disclosure. In addition, the descriptions described in relation to the algorithm of FIG. 5 may be done in alternative orders or in parallel to further the purposes of this disclosure. For example, conditional statements and logical evaluations, such as those at 508 and 512, may be performed in any order or in parallel or simultaneously to reduce lag or increase the speed of the system or method. As a further example, in some embodiments several criteria and/or media assets may be evaluated in parallel, using multiple logical processor threads, or the algorithm may be enhanced by incorporating branch prediction. Furthermore, it should be noted that the algorithm of FIG. 5 may be implemented on a combination of appropriately configured software and hardware, and that any of the devices or equipment discussed in relation to FIGS. 3-4 could be used to implement one or more portions of the algorithm.

The pseudocode in FIG. 6 describes an algorithm to generate a statistical relationship based on media asset consumption in accordance with some embodiments of the disclosure. It will be evident to one skilled in the art that the algorithm described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, media guidance application (e.g., via control circuitry 304 (FIG. 3)) may run a subroutine to initialize variables and prepare to generate a statistical relationship based on media asset consumption, which begins on line 605. For example, in some embodiments media guidance application (e.g., via control circuitry 304 (FIG. 3)) may copy instructions from non-transitory storage medium (e.g., storage device 308 (FIG. 3)) into RAM or into the cache for processing circuitry 306 (FIG. 3) during the initialization stage. Additionally, in some embodiments the value of data related to a media asset being used for comparison, or a tolerance level for determining if two values are essentially equivalent, may be retrieved, set, and stored at 601.

At line 605, media guidance application (e.g., via control circuitry 304 (FIG. 3)) may receive a criteria. In some embodiments these criteria may be retrieved from memory (e.g., storage device 308 (FIG. 3)) or a user input (e.g., received via user input interface 310 (FIG. 3)). Control circuitry 304 may receive a value for a criterion by receiving, for example, a pointer to an array of values of the criteria. In another example, control circuitry 304 may receive an object of a class, such as an iterator object containing elements of the criteria.

At line 606, media guidance application (e.g., via control circuitry 304 (FIG. 3)) may iterate through the various criteria, if only a single instance is available, the loop will only execute once. This loop may be implemented in multiple fashions depending on the choice of hardware and software language used to implement the algorithm of FIG. 6; for example, this may be implemented as part of a "for" or "while" loop.

At line 607, media guidance application (e.g., via control circuitry 304 (FIG. 3)) will store the value of a criterion into a temporary variable "A." In some embodiments the value of the criterion will be stored as part of a larger data structure or class, and the value of the criterion may be obtained through appropriate accessor methods. In some embodiments, the value of the criterion may be converted from a string or other non-numeric data type into a numeric data type by means of an appropriate hashing algorithm. In some embodiments, control circuitry 304 may call a function to perform a comparison of the value of the criterion to the value of data related to the media asset. In some embodiments, the criterion may be encoded as a primitive data structure, and rather than using a temporary variable, the criterion may be directly used in the comparisons at lines 609 and 611.

At line 608, media guidance application (e.g., via control circuitry 304 (FIG. 3)) will store the value of the data related to the media asset into a temporary variable "B." Similar to the criterion, in some embodiments the value of the data related to variable will be stored as part of a larger data structure or class, and the value of data related to the media asset may be obtained through accessor methods. In some embodiments, the value of data related to the media asset may be converted from a string or other non-numeric data type into a numeric data type by means of an appropriate hashing algorithm, or the data related to the media asset may be a primitive data structure, and may be directly used in the comparisons at lines 609 and 611.

At line 609, media guidance application (e.g., via control circuitry 304 (FIG. 3)) compares the value of A to the value of B to see if they are essentially equivalent. This is achieved by subtracting the value of B from A, taking the absolute value of the difference, and then comparing the absolute value of the difference to a predetermined tolerance level. In some embodiments, the tolerance level may be a set percentage of either A or B. In some embodiments, the tolerance level may be a fixed number. For example, setting the tolerance level to a set multiple of machine epsilon may allow for the algorithm to account for small rounding errors that may result from the use of floating point arithmetic. In some embodiments, the tolerance level may be set to zero, or the condition inside the IF statement may be replaced with a strict equivalence between A and B.

At line 610, media guidance application (e.g., via control circuitry 304 (FIG. 3)) will execute a subroutine to increase counter amount corresponding to the criterion if the condition in line 609 is satisfied. In some embodiments, this may be achieved by processing circuitry 306 (FIG. 3) sending the appropriate signals to control circuitry 304 (FIG. 3).

At line 612, media guidance application (e.g., via control circuitry 304 (FIG. 3)) may run a termination subroutine after the algorithm has performed its function. For example, in some embodiments, control circuitry 304 (FIG. 3) may destruct variables, perform garbage collection, free memory or clear the cache of processing circuitry 306 (FIG. 3).

It will be evident to one skilled in the art that the algorithm described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 7:
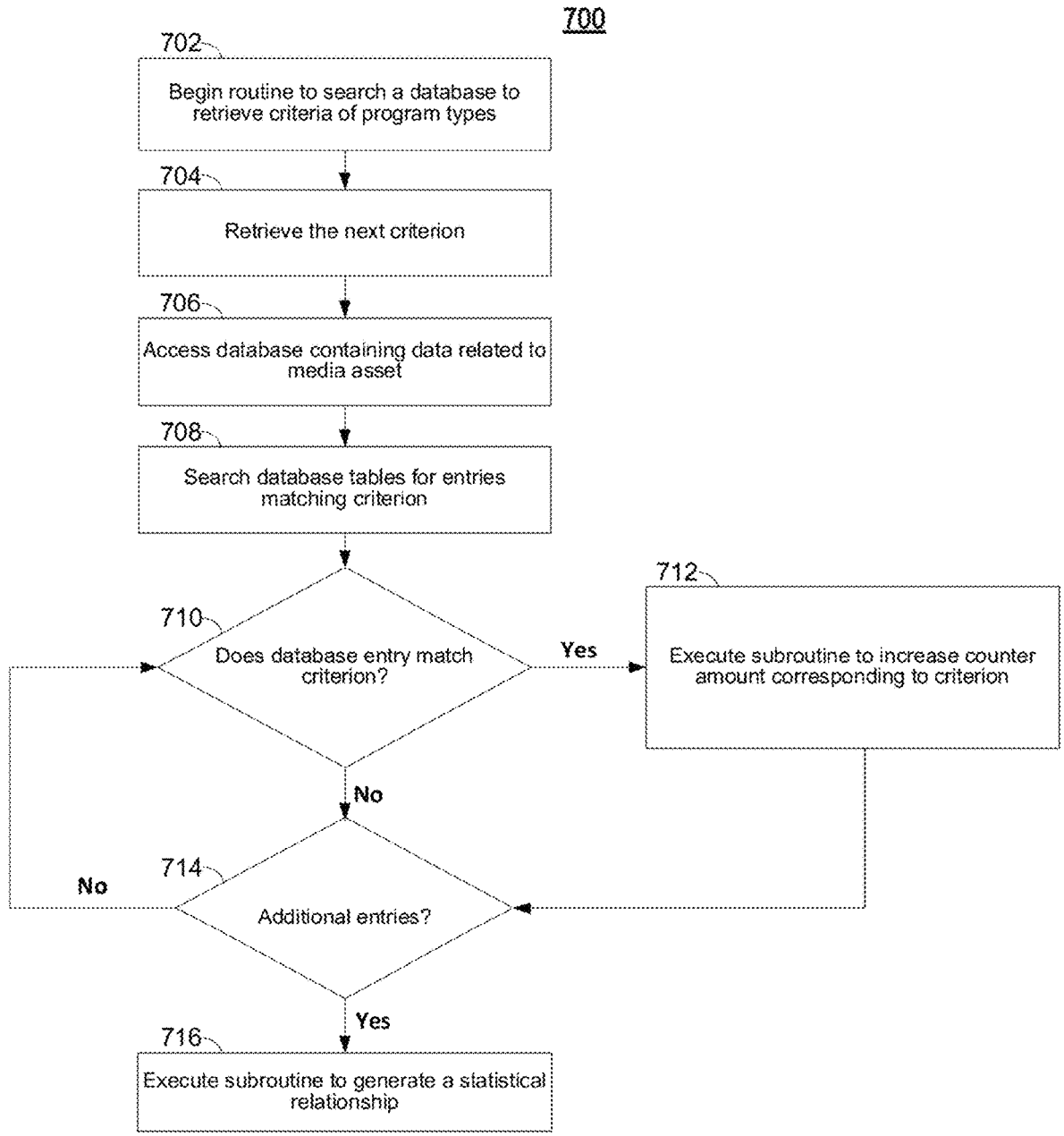
FIG. 7 is a flowchart of an illustrative process for using a database to increase a counter amount in accordance with some embodiments of the disclosure.

FIGS. 7 and 8 present an algorithm for media guidance application (e.g., via control circuitry 304) to generate a statistical relationship using a database containing data related to media assets in accordance with some embodiments of the disclosure. Similar to the algorithms described by FIGS. 5 and 6, in some embodiments, this algorithm may be encoded on to non-transitory storage medium (e.g., storage device 308 (FIG. 3)) as a set of instructions to be decoded and executed by processing circuitry (e.g., processing circuitry 306 (FIG. 3)). Processing circuitry may in turn provide instructions to other sub-circuits contained within control circuitry 304 (FIG. 3), such as the tuning, video generating, encoding, decoding, encrypting, decrypting, scaling, analog/digital conversion circuitry, and the like.

The flowchart in FIG. 7 describes an algorithm for a media guidance application (e.g., via control circuitry 304 (FIG. 3)) to search a database and generate a statistical relationship in accordance with some embodiments of the disclosure.

At step 702, the media guidance application (e.g., via control circuitry 304 (FIG. 3)) begins a routine to search a database to retrieve criteria of program types. In some embodiments, this may be done either directly or indirectly in response to a user action or input (e.g., from signals received by control circuitry 304 (FIG. 3) or user input interface 310 (FIG. 3)).

At step 704, the media guidance application (e.g., via control circuitry 304 (FIG. 3)) retrieves the next criterion from memory (e.g., storage 308 (FIG. 3) and/or any location accessible via communications network 414 (FIG. 4)). In some embodiments, the media guidance application (e.g., via control circuitry 304 (FIG. 3)) may retrieve a single primitive data structure that represents the value of the next criterion. In some embodiments, the media guidance application (e.g., via control circuitry 304 (FIG. 3)) may retrieve the value from a larger class or data structure.

At step 706, the media guidance application (e.g., via control circuitry 304 (FIG. 3)) accesses a database containing data related to a media asset. For example, the media guidance application may access a database that lists various characteristics about the media asset. In some embodiments, the media guidance application (e.g., via control circuitry 304 (FIG. 3)) may store this database locally (e.g., on storage device 308 (FIG. 3)) prior to beginning the algorithm. In some embodiments, the media guidance application (e.g., via control circuitry 304 (FIG. 3)) may also access the database by using communications circuitry to transmit information across a communications network (e.g., communications network 414 (FIG. 4)) to a database implemented on a remote storage device (e.g., media guidance data source 418 (FIG. 4)).

At step 708, the media guidance application (e.g., via control circuitry 304 (FIG. 3)) searches database tables for entries matching the criterion. In some embodiments, this may be done by comparing an identifier, for example a string or integer representing the criterion, that matches the types of identifiers used inside the database. In some embodiments, the media guidance application (e.g., via control circuitry 304 (FIG. 3)) may submit a general query to the database for table entries matching the criterion, and the media guidance application (e.g., via control circuitry 304 (FIG. 3)) may receive a list of indices or a data structure containing a portion of the database contents. In some embodiments, the database may implement a junction table that in turn cross-references entries from other databases. In this case, the media guidance application (e.g., via control circuitry 304 (FIG. 3)) may retrieve indices from a first database that, in turn, can be used to retrieve information from a second database. Although, the media guidance application (e.g., via control circuitry 304 (FIG. 3)) is described as interacting with a single database for purposes of clarity, it is understood that the algorithm of FIG. 7 may be implemented using multiple independent or cross-referenced databases.

At step 710, the media guidance application (e.g., via control circuitry 304 (FIG. 3)) determines if there is database entry that matches the criterion. In some embodiments, the media guidance application (e.g., via control circuitry 304 (FIG. 3)) may receive a signal from the database indicating that there are no matching entries. In some embodiments, control circuitry 304 may instead receive a list of indices or data structures with a NULL or dummy value. If the media guidance application (e.g., via control circuitry 304 (FIG. 3)) identifies that there are database entries matching the criterion, the media guidance application (e.g., via control circuitry 304 (FIG. 3)) proceeds to step 712, otherwise the media guidance application (e.g., via control circuitry 304 (FIG. 3)) proceeds to step 714.

At step 712, media guidance application (e.g., via control circuitry 304 (FIG. 3)) will execute a subroutine to increase counter amount corresponding to criterion. Afterwards, the media guidance application (e.g., via control circuitry 304 (FIG. 3)) may proceed to step 714 where it is determined if there are additional database entries to compare the criterion to. For example, the media guidance application (e.g., via control circuitry 304 (FIG. 3)) may compare the criterion to multiple database entries to determine whether or not any of the entries match the criterion. At step 714, the media guidance application (e.g., via control circuitry 304 (FIG. 3)) will execute a subroutine to generate a statistical relationship.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. For example, the media guidance application (e.g., via control circuitry 304 (FIG. 3)) may submit multiple queries to the database in parallel, or it may submit multiple queries to a plurality of similar databases in order to reduce lag and speed the execution of the algorithm. As a further example, although step 712 and step 716 are described as being mutually exclusive, both exact entries and similar entries may be processed for a single instance of the criterion. To further this purpose, in some embodiments, step 710 and step 714 may be performed in parallel by control circuitry 304. Furthermore, it should be noted that the algorithm of FIG. 7 may be implemented on a combination of appropriately configured software and hardware, and that any of the devices or equipment discussed in relation to FIGS. 3-4 could be used to implement one or more portions of the algorithm.

The pseudocode in FIG. 8 describes an algorithm to search a database and generate a statistical relationship in accordance with some embodiments of the disclosure. It will be evident to one skilled in the art that the algorithm described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, the media guidance application (e.g., via control circuitry 304 (FIG. 3)) may run a subroutine to initialize variables and prepare to retrieve criteria of program types, which begins on line 805. For example, in some embodiments, the media guidance application (e.g., via control circuitry 304 (FIG. 3)) may copy instructions from non-transitory storage medium (e.g., storage device 308 (FIG. 3)) into RAM or into the cache for processing circuitry 306 (FIG. 3) during the initialization stage.

At line 805, the media guidance application (e.g., via control circuitry 304 (FIG. 3)) may receive criteria for program types. In some embodiments, this criteria may be retrieved from memory (e.g., storage 308 (FIG. 3) and/or any location accessible via communications network 414 (FIG. 4)) or be based on a user input (e.g., received via user input interface 310 (FIG. 3)).

At line 806, the media guidance application (e.g., via control circuitry 304 (FIG. 3)) may iterate through the various instances of criteria; if only a single instance is available, the loop will only execute once. This loop may be implemented in multiple fashions depending on the choice of hardware and software language used to implement the algorithm of FIG. 8; for example, this may be implemented as part of a "for" or "while" loop, in some programming languages. In some embodiments, it may be convenient to store the instances of criteria in a single class or encapsulated data structure that will perform the loop as part of an internal method.

At line 807, the media guidance application (e.g., via control circuitry 304 (FIG. 3)) may query a database for entries matching a criterion. Depending on how the database is implemented and how the criterion is stored, an intermittent step may be required to convert the criterion into a form consistent with the database. For example, the media guidance application (e.g., via control circuitry 304 (FIG. 3)) may encode the criterion into a string or an integer using an appropriate hashing algorithm prior to being transmitted to the database by the media guidance application (e.g., via control circuitry 304 (FIG. 3)) as part of a query. In some embodiments, the criterion may be encoded as a primitive data structure, and the media guidance application (e.g., via control circuitry 304 (FIG. 3)) may submit the criterion as a query to the database directly. After querying the database, the media guidance application (e.g., via control circuitry 304 (FIG. 3)) may receive a set of database entries matching the criterion. In some embodiments, the media guidance application (e.g., via control circuitry 304 (FIG. 3)) may receive these entries in the form of a data-structure, a set of indices of the database, or a set of indices of another cross-referenced database.

At line 808, control circuitry 304 will determine if there are any database entries matching the criterion. In some embodiments, the media guidance application (e.g., via control circuitry 304 (FIG. 3)) may determine this by checking if the database returned an empty data structure or a NULL value in response to the query in line 807. If there are matching database entries the algorithm may proceed to line 809. If there were no matching database entries, the media guidance application (e.g., via control circuitry 304 (FIG. 3)) may instead proceed to line 812.

At line 809, control circuitry 304 may retrieve one or more values of media asset from the database entries matching the criterion. For example, if the media guidance application (e.g., via control circuitry 304 (FIG. 3)) retrieves a list of indices after querying the database in line 807, in some embodiments, the media guidance application (e.g., via control circuitry 304 (FIG. 3)) may retrieve the database entries for the media asset located at the received indices. In some embodiments, the indices may point to a larger data structure contained within the database, and the media guidance application (e.g., via control circuitry 304 (FIG. 3)) may retrieve the values of media asset from within the data structure using appropriate accessor methods. In some embodiments, the media guidance application (e.g., via control circuitry 304 (FIG. 3)) may retrieve the values of the media asset and store them in a separate data structure locally (e.g., in storage 308) prior to proceeding further. After retrieving the values of the media asset, the media guidance application (e.g., via control circuitry 304 (FIG. 3)) will proceed to line 810.

At line 810, the media guidance application (e.g., via control circuitry 304 (FIG. 3)) will execute a subroutine to use the values of the media asset and increase a counter amount corresponding to criterion using processing circuitry 306 (FIG. 3). Afterwards, the he media guidance application (e.g., via control circuitry 304 (FIG. 3)) may proceed to line 815.

At line 811, the media guidance application (e.g., via control circuitry 304 (FIG. 3)) may determine if there are any database entries similar to the criterion. For example, the criterion may be represented by an object of a class. Control circuitry 304 may call a function to perform a fuzzy comparison (e.g., a comparison to identify similar objects of the class) by comparing specific fields of the class or by performing approximate string matching on data related to the criterion. If database entries similar to the criterion are found by the media guidance application (e.g., via control circuitry 304 (FIG. 3)) then the media guidance application (e.g., via control circuitry 304 (FIG. 3)) proceeds to line 812. If the media guidance application (e.g., via control circuitry 304 (FIG. 3)) does not find matching entries (e.g., a query to the database returns a NULL value), the algorithm proceeds to line 812 and executes a subroutine to no increase the counter amount corresponding to the criterion.

At line 814, the media guidance application (e.g., via control circuitry 304 (FIG. 3)) may execute a termination subroutine after the media guidance application (e.g., via control circuitry 304 (FIG. 3)) has performed its function and all instances of the criterion have been processed and checked against the database. For example, in some embodiments the media guidance application (e.g., via control circuitry 304 (FIG. 3)) may destruct variables, perform garbage collection, free memory or clear the cache of processing circuitry 306 (FIG. 3).

It will be evident to one skilled in the art that the algorithm described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so the media guidance application (e.g., via control circuitry 304 (FIG. 3)) is instructed to evaluate multiple instances of criteria and submit multiple database queries simultaneously using a plurality of processors or processor threads. It is also understood that although the media guidance application is described as interacting with a single database, this is only a single embodiment described for illustrative purposes, and the media guidance application (e.g., via control circuitry 304 (FIG. 3)) of FIG. 8. may interact with multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow the media guidance application (e.g., via control circuitry 304 (FIG. 3)) to utilize a look-up table or database front-end efficiently stored on a small local drive to access a larger database stored on a remote server on demand.

Figure 9:
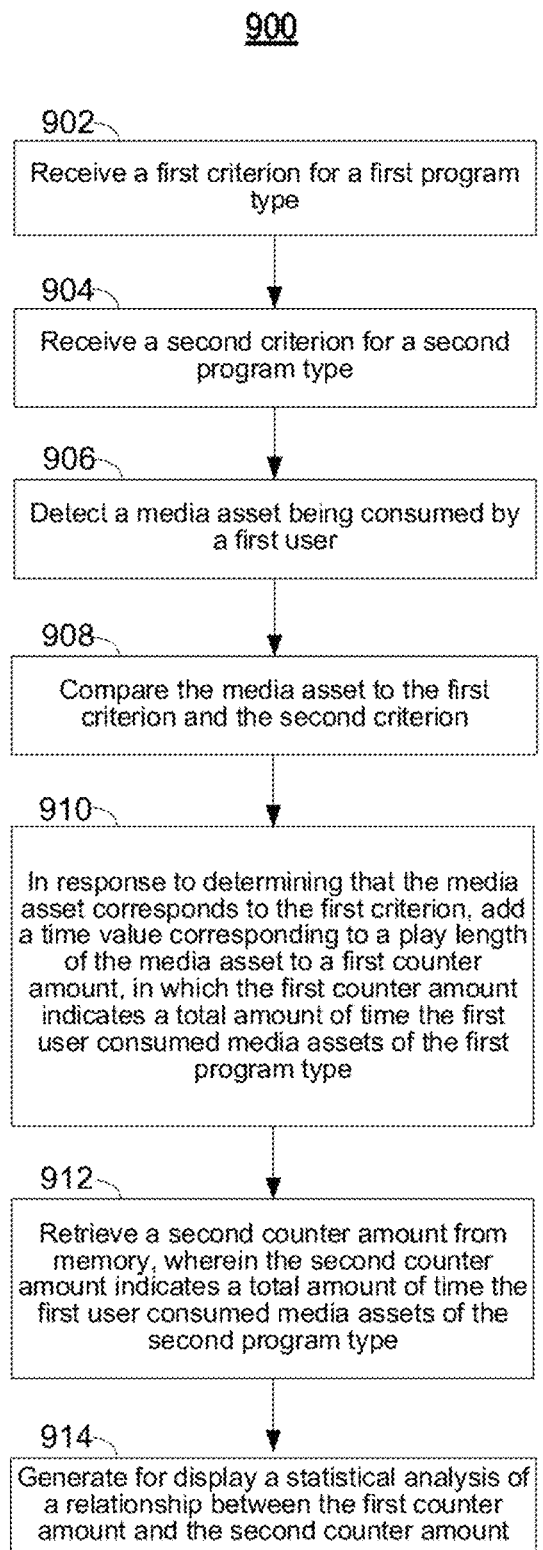
FIG. 9 is a flowchart of an illustrative process for generating a statistical analysis of a relationship between the first counter amount and the second counter amount in accordance with some embodiments of the disclosure.

FIG. 9 is a flowchart of an illustrative process for generating a statistical analysis of a relationship between the first counter amount and the second counter amount. It should be noted that process 900 or any step thereof could be performed on, or provided by, any of the devices shown in FIGS. 3-4. For example, process 900 may be executed by control circuitry 304 (FIG. 3) as instructed by a media guidance application implemented on user equipment 402, 404, and/or 406 (FIG. 4) in order to generate a statistical analysis of a relationship between the first counter amount and the second counter amount. In addition, one or more steps of process 900 may be incorporated into or combined with one or more steps of any other process or embodiment (e.g., FIGS. 5-8 and 10).

At step 902, the media guidance application retrieves (e.g., via control circuitry 304 (FIG. 3)) a first criterion (e.g., from storage 308 (FIG. 3) and/or any location accessible via communications network 414 (FIG. 4)) for a first program type. For example, the media guidance application may retrieve a user profile from memory, in which the user profile indicates a entertainment interest for a first user. For example, information in the user profile may indicate a current media asset relates to a hobby of the first user. The media guidance application may process this information to generate criteria for a first program type (e.g., entertainment programs).

At step 904, the media guidance application retrieves (e.g., via control circuitry 304 (FIG. 3)) a second criterion (e.g., from storage 308 (FIG. 3) and/or any location accessible via communications network 414 (FIG. 4)) for a second program type. For example, the media guidance application may process information in the user profile to generate criteria for a second program type (e.g., health and safety programs).

At step 906, the media guidance application detects (e.g., via control circuitry 304 (FIG. 3)) a media asset being consumed by the first user (e.g., via display 100 (FIG. 1)) and compares (e.g., via control circuitry 304 (FIG. 3)) the media asset to the first criterion and the second criterion at step 908. For example, the media guidance application may apply parental controls in response to detecting that the first user is consuming media assets. When applying the parental controls, the media guidance application may compare (e.g., via control circuitry 304 (FIG. 3)) media assets being consumed by a user (or data about those media assets) to the criteria (e.g., retrieved from storage 308 (FIG. 3) and/or any location accessible via communications network 414 (FIG. 4)) corresponding to different program types to determine whether or not the media asset corresponds to a particular program type. For example, the media guidance application may continuously compare media assets to the ever-changing information in the user profile to categorize media content in a dynamic and individualized manner.

At step 910, the media guidance application, in response to determining that the media asset corresponds to the first criterion, adds (e.g., via control circuitry 304 (FIG. 3)) a time value corresponding to a play length of the media asset to a first counter amount (e.g., retrieved from storage 308 (FIG. 3) and/or any location accessible via communications network 414 (FIG. 4)), in which the first counter amount indicates a total amount of time the first user consumed media assets of the first program type. For example, after categorizing media content in a dynamic and individualized manner, the media guidance application may track the amount of time the first user spends consuming media content of a particular type. For example, the media guidance application may notify a second user (e.g., a parent of the first user) in response to determining that the first counter amount equals or exceeds a threshold amount (e.g., a maximum amount of time that the second user allows the first user to consume media content of the particular type). For example, the second user may then determine whether or not to block the media content. In some embodiments, the media guidance application may provide other motivational mechanisms related to the threshold amount. For example, the media guidance application may generate, for display, to the first user a recommendation for an activity (e.g., completing homework, exercising, etc.) and in response to determining that the first user has completed the activity, increasing the threshold amount (e.g., allowing the first user to consume more media content of a particular type).

At step 912, the media guidance application retrieves (e.g., via control circuitry 304 (FIG. 3)) a second counter amount from memory (e.g., storage 308 (FIG. 3) and/or any location accessible via communications network 414 (FIG. 4)), in which the second counter amount indicates a total amount of time the first user consumed media assets of the second program type. For example, the first counter may track the amount of time that the first user has consumed educational media content and the second counter may track the amount of time that the first user has consumed non-educational media content.

At step 914, the media guidance application generates (e.g., via control circuitry 304 (FIG. 3)) for display a statistical analysis of a relationship between the first counter amount and the second counter amount. For example, the statistical analysis of the relationship between the first counter amount and the second counter amount may be a ratio of the amount of time the first user spent consuming educational media content to the amount of time the first user spent consuming non-educational media content. By generating the statistical analysis of a relationship between the first counter amount and the second counter amount, the media guidance application may provide a second user (e.g., a parent) with information upon which the second user can easily understand the viewing habits of the first user (e.g., a child). For example, the media guidance application may store the statistical analysis for review by the second user and/or transmit the statistical analysis to another device for review by the second user.

In some embodiments, the media guidance application may determine (e.g., via control circuitry 304 (FIG. 3)) a program type for all available media content in order to provide additional features to the first user. For example, the media guidance application may receive, from the first user, a user input requesting media content of the first program type (e.g., educational media content), and, in response to the user input, generate for display a listing for the media asset.

In some embodiments, the media guidance application may identify (e.g., via control circuitry 304 (FIG. 3)) the first user (e.g., via detection module 316 (FIG. 3)), and, in response to identifying the first user, search a database of counter amounts associated with the first user (e.g., located at storage 308 (FIG. 3) and/or any location accessible via communications network 414 (FIG. 4)) to determine the first counter amount and the second counter amount. For example, the media guidance application may store user profiles and counters that are individualized for a plurality of user. Through the use of one or more user authentication mechanisms, the media guidance application may determine which user is currently consuming media content and retrieve/update only the user profile and/or counters corresponding to that user.

In some embodiments, the media guidance application may publish (e.g., via control circuitry 304 (FIG. 3)) the statistical analysis. For example, the media guidance application may post the statistical analysis to a social media network in order to motivate the first user to view media content of a particular type (e.g., educational media content).

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

Figure 10:
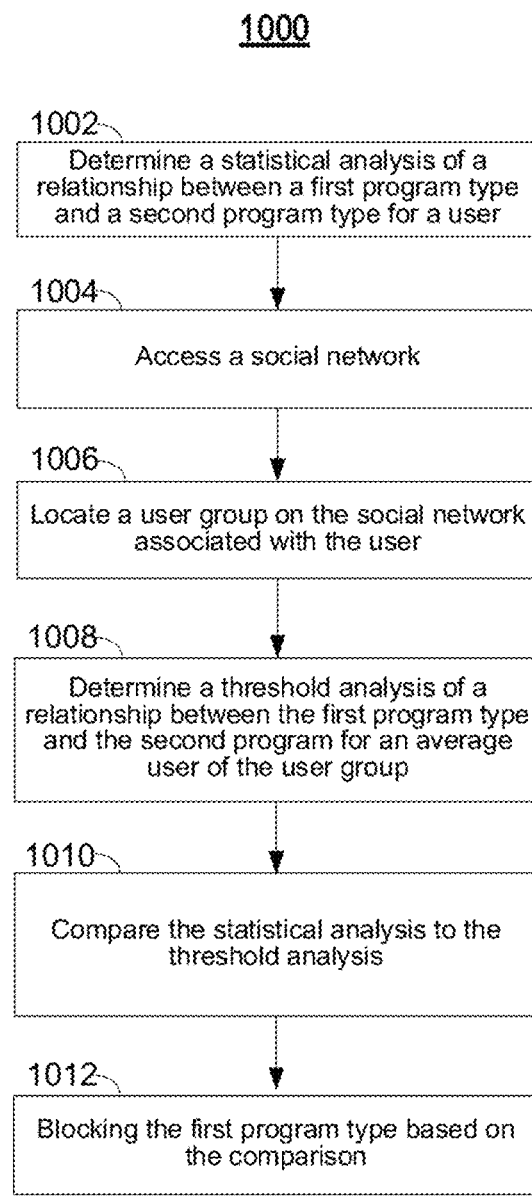
FIG. 10 is a flowchart of an illustrative process for using a threshold analysis of a relationship between a first program type and a second program for an average user of a user group to determine parental controls for a first user in accordance with some embodiments of the disclosure.

FIG. 10 is a flowchart of an illustrative process for using a threshold analysis of a relationship between a first program type and a second program for an average user of a user group to determine parental controls for a first user. It should be noted that process 1000 or any step thereof could be performed on, or provided by, any of the devices shown in FIGS. 3-4. For example, process 1000 may be executed by control circuitry 304 (FIG. 3) as instructed by a media guidance application implemented on user equipment 402, 404, and/or 406 (FIG. 4) in order to determine parental controls for a first user. In addition, one or more steps of process 1000 may be incorporated into or combined with one or more steps of any other process or embodiment (e.g., FIGS. 5-9).

At step 1002, the media guidance application determines (e.g., via control circuitry 304 (FIG. 3)) a statistical analysis of a relationship between a first program type and a second program type for a first user. For example, the media guidance application may determine a first ratio of a total amount of time the first user consumed media assets of the first program type (e.g., entertainment) to a total amount of time the first user consumed media assets of the second program type (e.g., education).

At step 1004, the media guidance application accesses (e.g., via I/O path 302 (FIG. 3)) a social network. For example, the media guidance application may access a database (e.g., located at storage 308 (FIG. 3) and/or any location accessible via communications network 414 (FIG. 4)) of information corresponding to a user group of the first user's peers. For example, by using information related to the peers of the first user, the media guidance application may develop parental controls that are in line with the social norms and mores of the users.

At step 1006, the media guidance application locates (e.g., via control circuitry 304 (FIG. 3)) a user group on the social network associated with the first user. For example, the media guidance application may retrieve (e.g., via control circuitry 304 (FIG. 3)) contacts (e.g., "friends") of an account (e.g., a social network profile) for the first user on the social network (e.g., in order to ensure that the users in the user group share the same social norms and mores as the first user). In another example, the media guidance application may match (e.g., via control circuitry 304 (FIG. 3)) demographic information of the first user to demographic information for each user of the user group (e.g., to ensure that the users in the user group are of the same age as the first user). In another example, the users in the user group may be selected (e.g., via control circuitry 304 (FIG. 3)) by the second user (e.g., in order to ensure that the threshold analysis is based on users that are approved by a parent of the first user).

At step 1008, the media guidance application determines (e.g., via control circuitry 304 (FIG. 3)) a threshold analysis of a relationship between the first program type and the second program for an average user of the user group. For example, the threshold analysis may be a second ratio of a total amount of time the average user of the user group consumed media assets of the first program type to a total amount of time the average user of the user group consumed media assets of the second program type.

At step 1010, the media guidance application may compare (e.g., via control circuitry 304 (FIG. 3)) the statistical analysis to the threshold analysis. For example, the media guidance application may determine (e.g., via control circuitry 304 (FIG. 3)) whether or not the statistical analysis exceeds the threshold analysis (e.g., whether a ratio of a total amount of time the first user consumed media assets of the first program type to a total amount of time the first user consumed media assets of the second program type exceeds that of a ratio of a total amount of time the average user of the user group consumed media assets of the first program type to a total amount of time the average user of the user group consumed media assets of the second program type.

At step 1012, the media guidance application (e.g., via control circuitry 304 (FIG. 3)) blocks the first program type. Additionally or alternatively, the media guidance application may alert (e.g., via control circuitry 304 (FIG. 3)) a second user (e.g., a parent of the first user) based on the comparison. For example, in response to determining (e.g., via control circuitry 304 (FIG. 3)) that a ratio of a total amount of time the first user consumed media assets of the first program type to a total amount of time the first user consumed media assets of the second program type exceeds that of a ratio of a total amount of time the average user of the user group consumed media assets of the first program type to a total amount of time the average user of the user group consumed media assets of the second program type, the media guidance application may automatically block the first user from consuming any more media assets of the first program type.

In some embodiments, the media guidance application may determine (e.g., via control circuitry 304 (FIG. 3)) the threshold analysis in real time or on a periodic basis in order to ensure that the threshold analysis is current. For example, the threshold analysis may differ based on a month (e.g., whether or not school is in session), a time of year (e.g., summer versus winter), or on a particular day (e.g., a weekend day versus a school day).

In some embodiments, the media guidance application may also modify (e.g., via control circuitry 304 (FIG. 3)) the threshold analysis based on information received from a data source selected by the second user. For example, a parent may wish to receive updates on the progress of a child at school or at a part-time job. If the parent notices that the child is performing well at school or at a job, the parent may wish to allow a child to have a higher ratio of entertainment programs to education programs. In contrast, if the parent notices that the child is performing poorly at school or at a job, the parent may wish to allow a child to have a lower ratio of entertainment programs to education programs.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 10.

Figure 11:
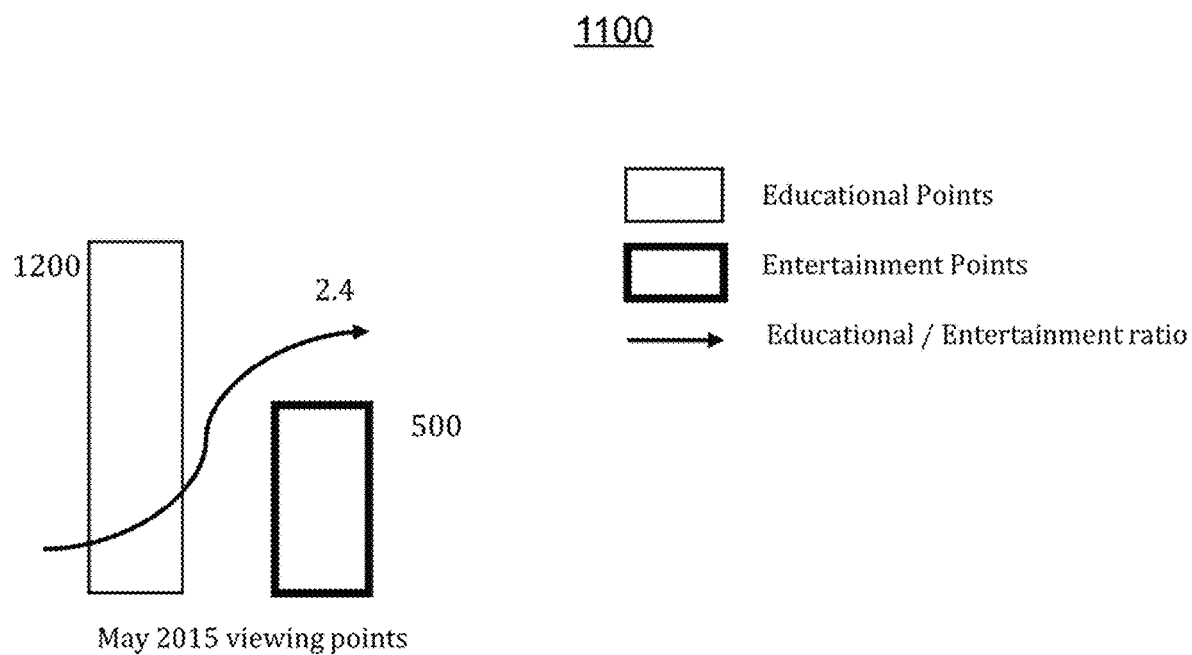
FIG. 11 is a diagram of a relationship between a first program type and a second program in accordance with some embodiments of the disclosure.

FIG. 11 is a diagram of a relationship between a first program type and a second program. For example, FIG. 11 shows relationship 1100. In this case, relation 1100 indicates the amount of "points" that a user has received based on the amount of media content the user has consumed during a particular month (e.g., May). In some embodiments, relationship 1100 may appear in or be generated as a part of window 206 (FIG. 2)).

As shown in FIG. 11, relationship 1100 describes the relationship between educational points to entertainment points. For example, each educational point may constitute a minute of educational programming that the user consumed during the current time period. Likewise, each entertainment point may constitute a minute of entertainment programming that the user consumed during the current time period. Additionally or alternatively, the amount of points may be based on additional activities performed by a user (e.g., related to a proficiency in school, work, etc.).

As shown in FIG. 11, the media guidance application has generated a statistical relationship between the amount of educational points and the amount of entertainment points. For example, the media guidance application has determined a ratio between the amount of educational points and the amount of entertainment points. In the present case, the ratio corresponds to 2.4 (i.e., indicating how many times the first number contains the second).

Figure 12:
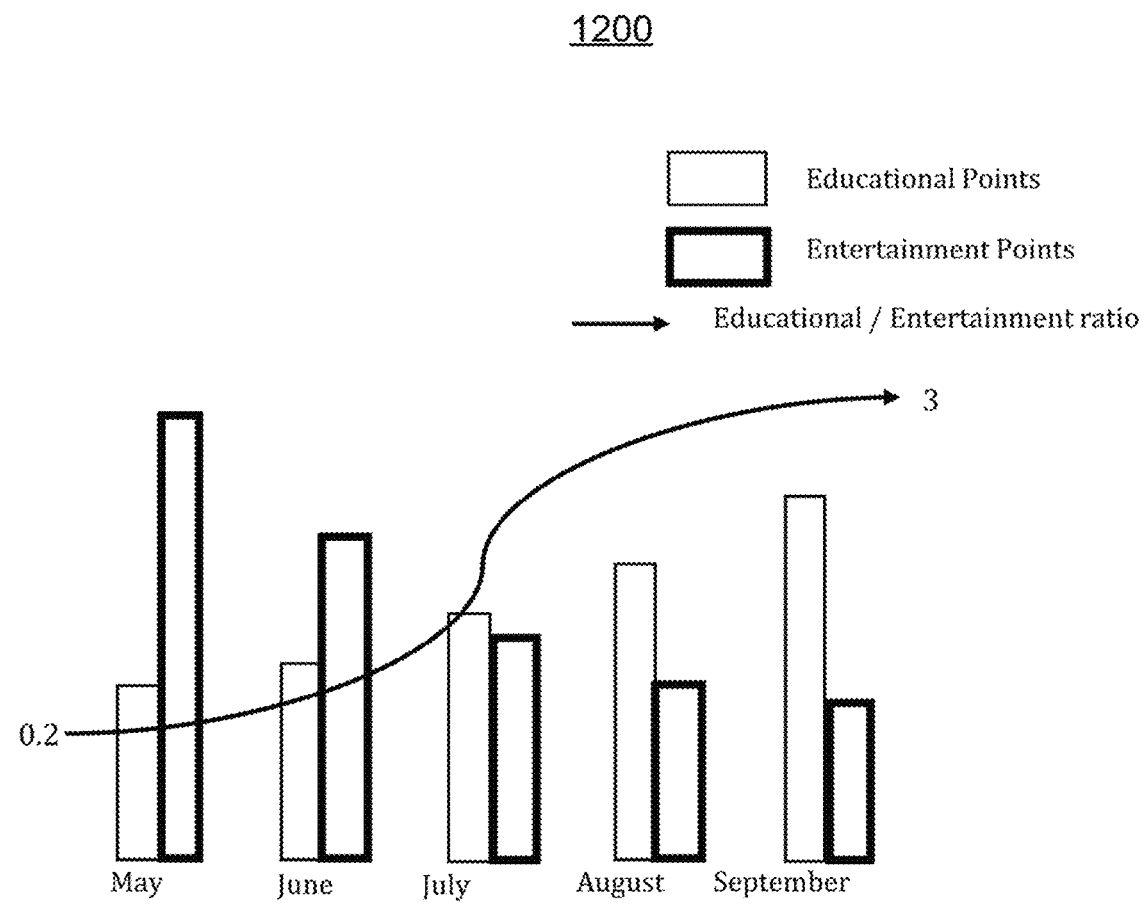
FIG. 12 is a diagram of a change in a relationship between a first program type and a second program as a function of time in accordance with some embodiments of the disclosure.

FIG. 12 is a diagram of a change in a relationship between a first program type and a second program as a function of time. For example, FIG. 12 shows relationship 1200. Relationship 1200 tracks the ratio of educational points to entertainment points (e.g., as described above in FIG. 11) over a larger time period. Furthermore, relationship 1200 graphically expresses the ratio over a period of time. For example, FIG. 1200 includes a line that shows how the ratio has gone from 0.2 to 3 over a period of a few monthS.

In some embodiments, relationship 1200 may appear in window 206 (FIG. 2). Furthermore, a user (e.g., a parent) may use relationship 1200 to monitor the media consumption of another user (e.g., a child) over time. In some embodiments, relationship 1200 may indicate data points from repeated determinations of a statistical relationship of a first user and/or a comparison with a threshold relationship. For example, over a period of several months the statistical relationship and/or various thresholds may have been determined in a continuous manner. Based on the determinations, the media guidance application may generate relationship 1200.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
receiving, via a first computing device providing access to a primary profile associated with a user account, a selection of a content rating threshold for a secondary profile associated with the user account, wherein the user account authorizes streaming of content from a content provider server over a communication network, wherein entry of a primary profile credential enables selection of the content rating threshold for the secondary profile, the primary profile is accessible via each of a plurality of computing devices upon entry of the primary profile credential, and the secondary profile is accessible via each of the plurality of computing devices upon entry of a secondary profile credential;
causing display of a criteria entry field at the first computing device providing access to the primary profile, and receiving an entry in association with the criteria entry field; and
in response to receiving the selection of the content rating threshold and receiving the entry:
storing the content rating threshold and the received entry in memory in association with the secondary profile, and
applying the content rating threshold and the received entry to the secondary profile by:
permitting, for the secondary profile, display of content items having content ratings at or below the stored content rating threshold and that do not correspond to the received entry,
preventing, for the secondary profile, display of content items having content ratings above the stored content rating threshold, and
preventing, for the secondary profile, display of a content item having a content rating at or below the stored content rating threshold in response to determining that the content item corresponds to the received entry.

2. The method of claim 1, further comprising:
receiving selections of a plurality of respective content rating thresholds for a plurality of secondary profiles associated with the user account, the plurality of content rating thresholds being independently selectable with respect to one another;
storing the plurality of content rating thresholds in memory in association with the respective plurality of secondary profiles, wherein entry of the primary profile credential enables selection of the content rating threshold for each of the secondary profiles; and
determining whether to permit display of content items for the plurality of secondary profiles based on the respective content rating thresholds.

3. The method of claim 1, further comprising:
detecting activity for the secondary profile via the first computing device; and
retrieving the stored content rating threshold from the memory in response to detecting the activity for the secondary profile via the first computing device.

4. The method of claim 3, wherein detecting activity for the secondary profile via the first computing device comprises authenticating the secondary profile by utilizing an authentication method.

5. The method of claim 1, further comprising:
causing display of a menu comprising a plurality of content rating threshold options from which the content rating threshold for either the primary profile or the secondary profile is selectable.

6. The method of claim 1, further comprising storing in the memory a plurality of respective content rating thresholds for a plurality of secondary profiles associated with the user account, the plurality of content rating thresholds being independently selectable.

7. The method of claim 1, further comprising:
receiving a selection of a time limit;
determining media content is being displayed on the first computing device via the secondary profile;
in response to determining the media content is being displayed on the first computing device via the secondary profile, initiating a countdown timer;
detecting when the countdown timer reaches the time limit; and
preventing the first computing device from displaying the media content in response to detecting when the countdown timer reaches the time limit.

8. The method of claim 1, wherein the content rating threshold and the received entry is applied to the secondary profile irrespective of which particular computing device of the plurality of computing devices is being used to access the secondary profile.

9. The method of claim 1, wherein the content rating threshold and the received entry is applied to the secondary profile when the secondary profile is accessed via the first computing device.

10. A system comprising:
a memory storing instructions; and
control circuitry configured to execute the instructions to:
receive, via a first computing device providing access to a primary profile associated with a user account, a selection of a content rating threshold for a secondary profile associated with the user account, wherein the user account authorizes streaming of content from a content provider server over a communication network, wherein entry of a primary profile credential enables selection of the content rating threshold for the secondary profile, the primary profile is accessible via each of a plurality of computing devices upon entry of the primary profile credential, and the secondary profile is accessible via each of the plurality of computing devices upon entry of a secondary profile credential;
causing display of a criteria entry field at the first computing device providing access to the primary profile, and receiving an entry in association with the criteria entry field; and
in response to receiving the selection of the content rating threshold and receiving the entry via the user account:
store the content rating threshold and the received entry in memory in association with the secondary profile, and
apply the content rating threshold and the received entry to the secondary profile by:

permitting for the secondary profile, display of content items having content ratings at or below the stored content rating threshold and that do not correspond to the received entry, preventing, for the secondary profile, display of content items having content ratings above the stored content rating threshold, and preventing, for the secondary profile, display of a content item having a content rating at or below the stored content rating threshold in response to determining that the content item corresponds to the received entry.

11. The system of claim 10, wherein the control circuitry is further configured to:

receive selections of a plurality of respective content rating thresholds for a plurality of secondary profiles associated with the user account, the plurality of content rating thresholds being independently selectable with respect to one another;

store the plurality of content rating thresholds in memory in association with the respective plurality of secondary profiles, wherein entry of the primary profile credential enables selection of the content rating threshold for each of the secondary profiles; and determine whether to permit display of content items for the plurality of secondary profiles based on the respective content rating thresholds.

12. The system of claim 10, wherein the control circuitry is further configured to:

detect activity for the secondary profile via the first computing device; and retrieve the stored content rating threshold from the memory in response to detecting the activity for the secondary profile via the first computing device.

13. The system of claim 12, wherein the control circuitry is further configured to detect activity for the secondary profile via the first computing device by authenticating the secondary profile by utilizing an authentication method.

14. The system of claim 10, wherein the control circuitry is further configured to:

cause display of a menu comprising a plurality of content rating threshold options from which the content rating threshold for either the primary profile or the secondary profile is selectable.

15. The system of claim 10, wherein the control circuitry is further configured to store in the memory a plurality of respective content rating thresholds for a plurality of secondary profiles associated with the user account, the plurality of content rating thresholds being independently selectable.

16. The system of claim 10, wherein the control circuitry is further configured to:

receive a selection of a time limit;

determine media content is being displayed via the secondary profile;

in response to determining the media content is being displayed via the secondary profile, initiating a countdown timer;

detect when the countdown timer reaches the time limit; and prevent the display of the media content in response to detecting when the countdown timer reaches the time limit.

17. The system of claim 10, wherein the control circuitry is configured to apply the content rating threshold and the received entry to the secondary profile irrespective of which particular computing device of the plurality of computing devices is being used to access the secondary profile.

18. The system of claim 10, wherein the control circuitry is configured to apply the content rating threshold and the received entry to the secondary profile when the secondary profile is accessed via the first computing device.

19. A system comprising:

means for receiving, via a first computing device providing access to a primary profile associated with a user account, a selection of a content rating threshold for a secondary profile associated with the user account, wherein the user account authorizes streaming of content from a content provider server over a communication network, wherein entry of a primary profile credential enables selection of the content rating threshold for the secondary profile, the primary profile is accessible via each of a plurality of computing devices upon entry of the primary profile credential, and the secondary profile is accessible via each of the plurality of computing devices upon entry of a secondary profile credential;

means for causing display of a criteria entry field at the first computing device providing access to the primary profile, and means for receiving an entry in association with the criteria entry field; and means for in response to receiving the selection of the content rating threshold:

storing the content rating threshold and the received entry in memory in association with the secondary profile, and applying the content rating threshold and the received entry to the secondary profile by:

permitting, for the secondary profile, display of content items having content ratings at or below the stored content rating threshold and that do not correspond to the received entry, preventing, for the secondary profile, display of content items having content ratings above the stored content rating threshold, and preventing, for the secondary profile, display of a content item having a content rating at or below the stored content rating threshold in response to determining that the content item corresponds to the received entry.

20. The system of claim 19, further comprising:

means for receiving selections of a plurality of respective content rating thresholds for a plurality of secondary profiles associated with the user account, the plurality of content rating thresholds being independently selectable with respect to one another;

means for storing the plurality of content rating thresholds in memory in association with the respective plurality of secondary profiles, wherein entry of the primary profile credential enables selection of the content rating threshold for each of the secondary profiles; and means for determining whether to permit display of content items for the plurality of secondary profiles based on the respective content rating thresholds.

21. The system of claim 19, further comprising:

means for detecting activity for the secondary profile via the first computing device; and means for retrieving the stored content rating threshold from the memory in response to detecting the activity for the secondary profile via the first computing device.

22. The system of claim 21, wherein the means for detecting activity for the secondary profile via the first computing device comprises means for authenticating the secondary profile by utilizing an authentication method.

23. The system of claim 19, further comprising:
means for causing display of a menu comprising a plurality of content rating threshold options from which the content rating threshold for either the primary profile or the secondary profile is selectable.

24. The system of claim 19, further comprising means for storing in the memory a plurality of respective content rating thresholds for a plurality of secondary profiles associated with the user account, the plurality of content rating thresholds being independently selectable.

25. The system of claim 19, further comprising:
means for receiving a selection of a time limit;
means for determining media content is being displayed on the first computing device via the secondary profile;
means for, in response to determining the media content is being displayed on the first computing device via the secondary profile, initiating a countdown timer;
means for detecting when the countdown timer reaches the time limit; and
means for preventing the first computing device from displaying the media content in response to detecting when the countdown timer reaches the time limit.

26. The system of claim 19, wherein the means for in response to receiving the selection of the content rating threshold and receiving the entry comprises means for applying the content rating threshold and the received entry to the secondary profile irrespective of which particular computing device of the plurality of computing devices is being used to access the secondary profile.

27. The system of claim 19, wherein the means for in response to receiving the selection of the content rating threshold and receiving the entry comprises means for applying the content rating threshold and the received entry to the secondary profile when the secondary profile is accessed via the first computing device.

* * * * *